June 4, 1940.　　　A. C. POWELL　　　2,202,921
TROUBLE RECORDER
Filed Nov. 5, 1938　　　22 Sheets-Sheet 1

FIG. 1

| FIG. 5 | FIG. 10 | FIG. 14 | FIG. 18 | FIG. 22 |
| FIG. 4 | FIG. 9 | FIG. 13 | FIG. 17 | FIG. 21 |
| FIG. 3 | FIG. 8 | FIG. 12 | FIG. 16 | FIG. 20 |
| FIG. 2 | FIG. 7 | FIG. 11 | FIG. 15 | FIG. 19 |
| | FIG. 6 | | | |

INVENTOR
A. C. POWELL
BY P. C. Smith
ATTORNEY

June 4, 1940.    A. C. POWELL    2,202,921
TROUBLE RECORDER
Filed Nov. 5, 1938    22 Sheets-Sheet 2

INVENTOR
A.C. POWELL
BY P.C. Smith
INVENTOR

June 4, 1940. A. C. POWELL 2,202,921
TROUBLE RECORDER
Filed Nov. 5, 1938 22 Sheets-Sheet 9

INVENTOR
A. C. POWELL
BY P. C. Smith
ATTORNEY

June 4, 1940.  A. C. POWELL  2,202,921
TROUBLE RECORDER
Filed Nov. 5, 1938  22 Sheets-Sheet 12

INVENTOR
A.C. POWELL
BY
P. C. Smith
ATTORNEY

June 4, 1940.　　　A. C. POWELL　　　2,202,921
TROUBLE RECORDER
Filed Nov. 5, 1938　　　22 Sheets-Sheet 13

INVENTOR
A.C. POWELL
BY P. C. Smith
ATTORNEY

June 4, 1940.　　　A. C. POWELL　　　2,202,921
TROUBLE RECORDER
Filed Nov. 5, 1938　　　22 Sheets-Sheet 15

INVENTOR
A.C. POWELL
BY P. C. Smith
ATTORNEY

June 4, 1940.　　　A. C. POWELL　　　2,202,921
TROUBLE RECORDER
Filed Nov. 5, 1938　　　22 Sheets-Sheet 16

INVENTOR
A.C. POWELL
BY
P. C. Smith
ATTORNEY

June 4, 1940.   A. C. POWELL   2,202,921
TROUBLE RECORDER
Filed Nov. 5, 1938   22 Sheets-Sheet 17

INVENTOR
A.C. POWELL
BY
P. C. Smith
ATTORNEY

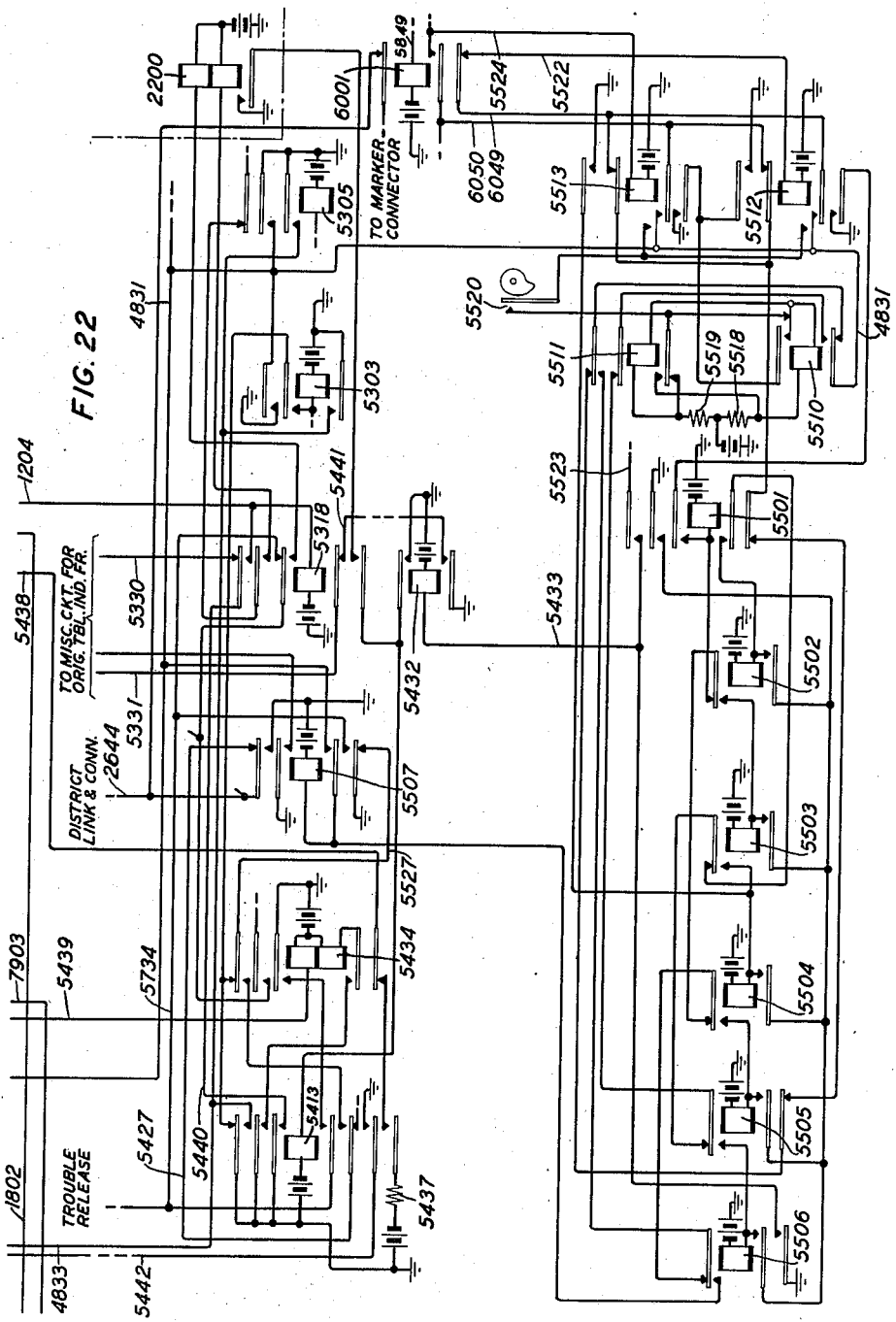

Patented June 4, 1940

2,202,921

UNITED STATES PATENT OFFICE 2,202,921

TROUBLE RECORDER

Albert C. Powell, New York, N. Y., assignor to Bell Telephone Laboratories, Incorporated, New York, N. Y., a corporation of New York Application November 5, 1938, Serial No. 239,052

5 Claims. (Cl. 179—175.2)

This invention relates to telephone systems and has for its object improvement in the recording of trouble conditions in telephone systems.

In telephone systems employing switch controlling equipment, a convenient method of detecting irregularities in operation has been the use of timing arrangements which set time limits for the various stages of the operation and, if permitted to complete their function, cause the controlling equipment to be connected with a recording device which makes a record of the connection desired and of the condition which caused the connection to fail.

In the telephone system described in the application of W. W. Carpenter, Serial No. 214,356, filed June 17, 1938, the number of the wanted subscriber's line is recorded in a sender, which transmits the office designation or code to a decoder marker which, in turn, determines the routing required and transmits back to the sender such information as is needed by the sender to complete its operation and then proceeds to select, and connect with the calling line, a trunk leading to terminating equipment at the office in which the called line is located. The sender then controls the terminating equipment directly or indirectly to complete the connection.

The operation of the decoder marker may be considered to include two stages, viz., the decoding stage during which the code is received, decoded and the information returned to the sender, and the marking or switch controlling stage. When the first stage has been completed, a signal is transmitted to the sender, disconnecting it from the decoder marker, and releasing the recording registers of the sender so that a second sender may establish a connection with the decoder marker and the decoding stage of the second call may overlap the marking stage of the first call.

In accordance with the present invention a trouble indicator is provided which may be signaled because of delay in either stage of a single call, with means for indicating in which stage the trouble occurred. If two calls are being handled by the marker, only the call in the marking stage may summon the trouble indicator.

Associated with the trouble indicator is a test circuit for setting up in the marker, records similar to those set up by senders. In accordance with the present invention, the test circuit also simulates certain switching equipment to satisfy tests performed by the marker. Furthermore, it prevents the release of the record at the end of the decoding stage and transformes the regular release signal of the marker into a trouble release signal so that on all test calls the information which would have been transmitted to a sender may be determined.

A clearer understanding of the invention may be obtained from consideration of the following description of the attached drawings in which:

Fig. 1 shows the manner in which Figs. 2 to 22 should be arranged;

Fig. 22 shows the timing relays of the decoder marker.

Figure 2:
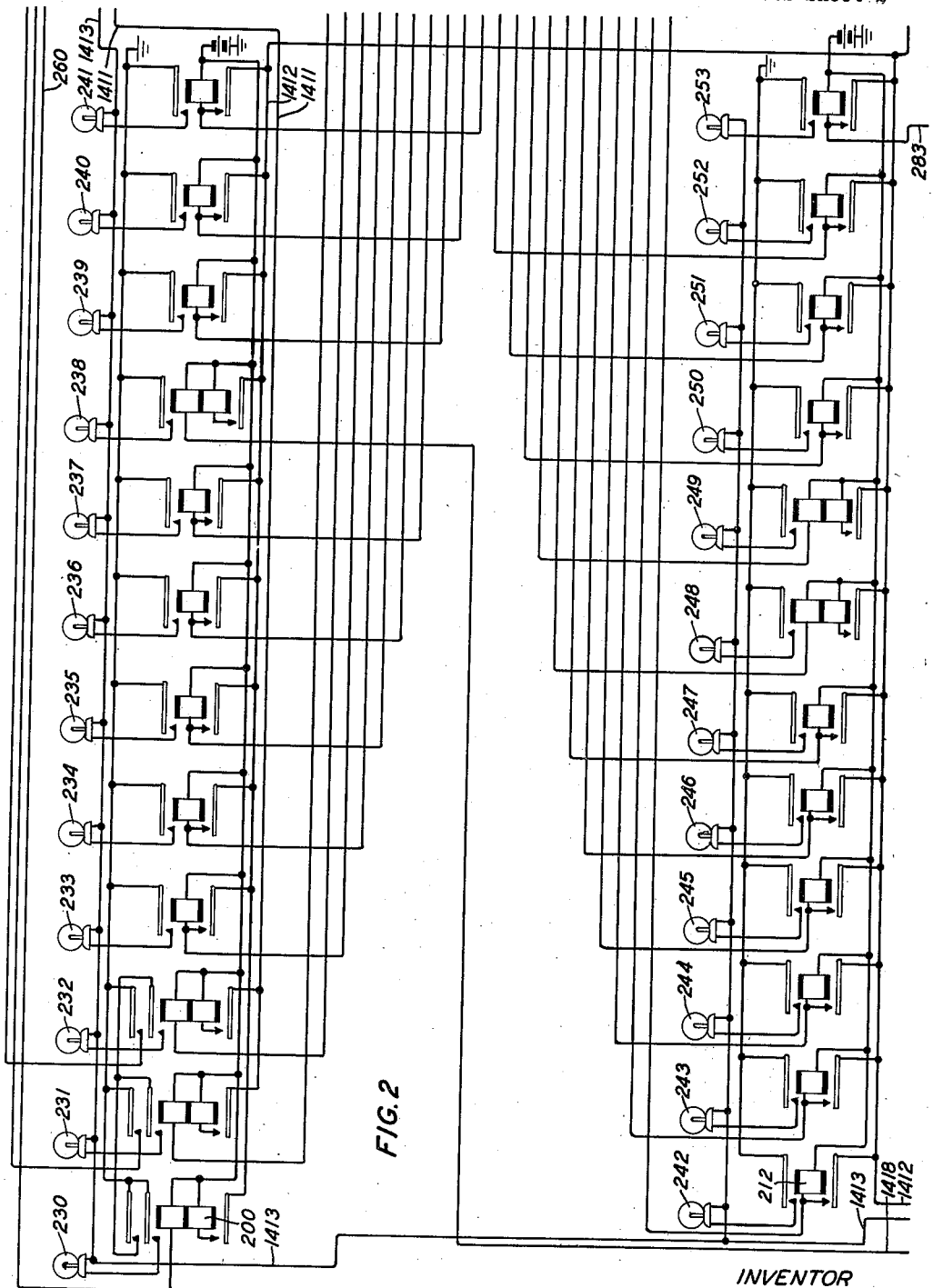
Figs. 2, 4, 6, 7, 9, 11, 13, 15, 17, 19 and 21 show recording relays and lamps for indicating the condition of the marker.
Figure 3:
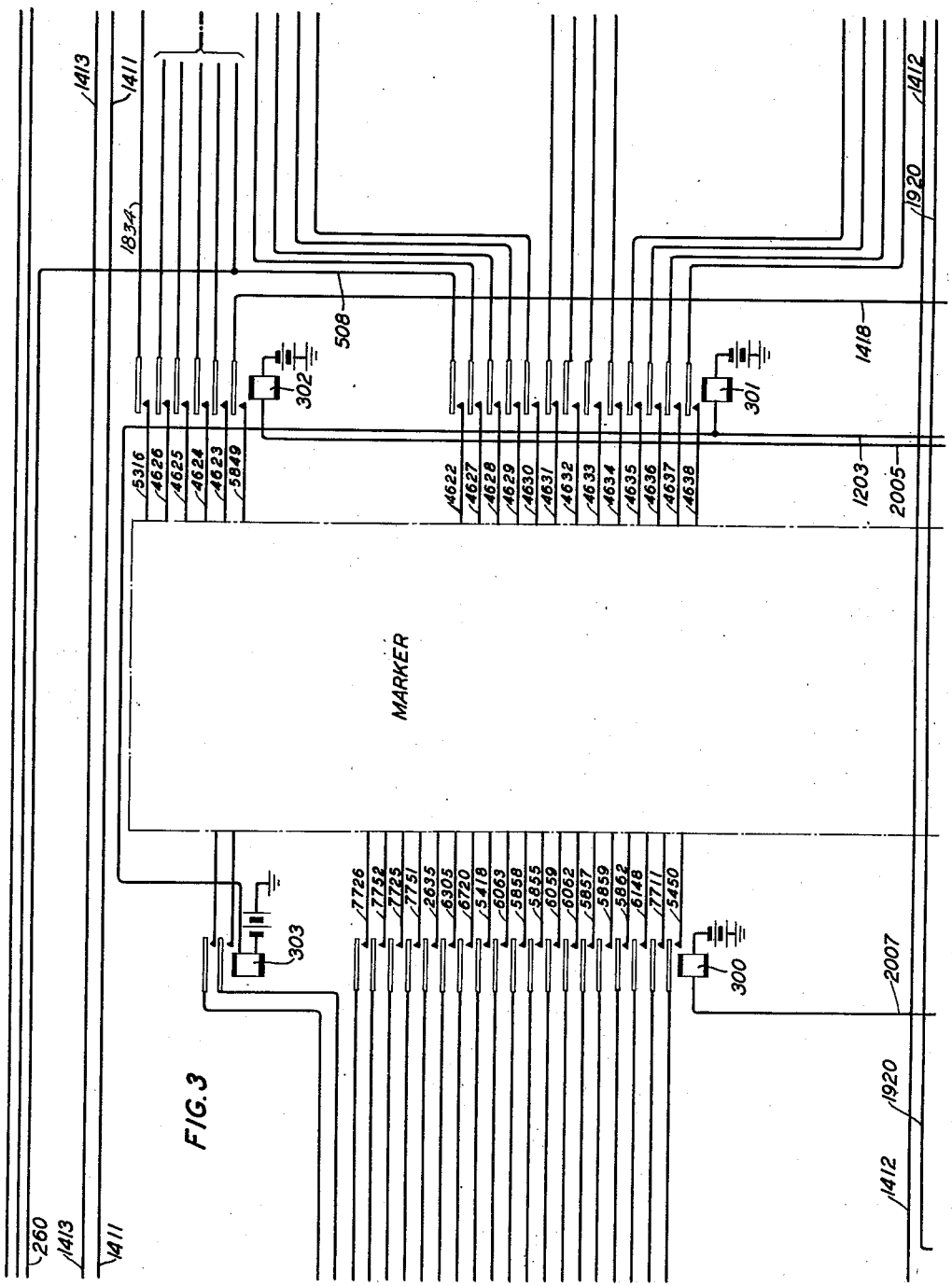
Figs. 3, 8, 12, 16 and 20 show the multicontact relays by which the indicator and decoder marker are connected.

Since the decoder marker, with which applicant's trouble indicator works, has been disclosed and its operation described in detail in the above-mentioned Carpenter application, no attempt has been made to disclose the complete circuits thereof in the present application. Such parts as are disclosed have been given the same numbers as are used in the Carpenter application with the exception of the multicontact relays of Figs. 3, 8, 12, 16 and 20. In the Carpenter application four multicontact relays are shown, viz., relays 7904, 7905, 8000 and 8001, while for convenience in the present disclosure, eighteen relays have been shown, viz., 300, 301, 302, 303, 800, 801, 1200, 1201, 1202, 1600, 1601, 1602, 1603, 2000, 2001, 2002, 2003 and 2004. The equipment of the decoder marker itself is indicated by the dot-dash rectangle extending through the figures mentioned.

Brief description

When a decoder marker is seized, the timing control lead 4831 is grounded and the timing relays measure off a time interval sufficient to perform the decoding operation and to establish connection with the sender by way of the district junctor. If this stage is completed promptly, the timing relays are released and the new timing interval started to cover the marking stage.

If the call fails in either stage the marker attempts to connect with the trouble indicator. The trouble indicator includes a marker preference relay, a pair of lamps, a test key and a test relay for each marker. The preference relays and the test keys are arranged in a chain to insure that only one marker may be connected with, at a time. One lamp indicates that the record was taken from the corresponding marker, the other lamp indicates that the corresponding marker had been in trouble but the trouble indicator was busy when that marker attempted to connect with it.

The trouble indicator also includes a plurality of relays which are connected by multicontact relays in the individual markers with conductors branching from all significant circuits in the marker. For example, there are branches on each of the circuits over which the marker receives information from and transmits information to the sender. There are branches on the circuits by which the outgoing trunk and interconnecting channel are selected. Furthermore, the marker is equipped with trouble detecting relays, and circuits controlled by these relays are also extended to the trouble indicator.

When a marker summons the trouble indicator and connects with it during the decoding stage the record includes the information transmitted to the marker and that returned to the sender, together with an indication of the trouble condition which blocked the call. When the trouble indicator is seized by a marker in the marking stage, handling a single call, the record may indicate the outgoing trunk selected, the channel selected and the trouble condition. Where two calls are being handled, the record will include the registration information on the second call as well as the trunk selecting information on the first call, but only the latter part of the record is of significance.

When the marker is to be tested, it is selected by a test key and a registration set up under the control of the test key set in simulation of a sender. When the registration has been translated, the attempt of the marker to dismiss the sender causes the test circuit to lock in the record of this stage of the marker operation and advance the marker to its marking stage. When the marker completes its operation and attempts to release, the release signal summons the trouble indicator which records the result of the marking stage and then permits the marker to release.

Marker timing

The operation of the decoder marker timing circuit and the manner in which it connects with the trouble indicator will first be described.

The timing circuit shown in Fig. 22 comprises relays 5501 to 5507 and 5510 to 5513, inclusive, together with the associated interrupter 5520. The timing cycle, measured under the control of these relays and interrupter, is divided into two intervals which correspond to the stages above mentioned, the first of which includes a subsidiary interval which covers the operation of the marker from its seizure to the point where it has properly recorded all of the information which the sender is required to transmit to it.

Specifically, the first interval covers the operation of the marker from its seizure until it has connected with the district and office frame and the particular district junctor involved in the call, while the second interval covers the operation of the marker from the end of the first interval until the marker has restored to normal.

The operation of the marker connector circuit in connecting the sender with the marker connects ground to conductor 4831. Assuming that the marker is not engaged on another call in the marker stage, as indicated by the fact that relay 6001 is not operated, relay 5512 operates in a circuit from battery through its winding, conductor 5522, back contact of relay 6001, conductor 6049, back contacts of relays 5513, 5501, 5505, 5511 and 5510 to the ground on conductor 4831. Relay 5512 locks over its middle lower contact to grounded conductor 4831 and extends this ground over its inner lower front contact to the armature of interrupter 5520. When the interrupter closes its contact, relay 5510 operates in a circuit from battery through resistance 5518, winding and upper normal contact of relay 5510, to ground over the interrupter 5520. Relay 5510, in operating, locks over its upper front contact to ground over the upper front contact of relay 5512, and prepares a circuit for relay 5511 from battery through resistance 5519, winding of relay 5511, upper front contact of relay 5510 to ground at the contact of relay 5512. Relay 5511 does not operate at this time since its winding is shunted, over its own lower back contact, by the ground supplied under control of the interrupter contacts. When interrupter 5520 subsequently opens its contacts, this shunt is removed and relay 5511 operates. Upon the second closure of the contacts of interrupter 5520, relay 5510 releases, its winding being shunted by the ground over the interrupter contacts and over the lower make contact of relay 5511. Relay 5511, upon the release of relay 5510, holds over the upper normally closed contacts of relay 5510 to the ground supplied through the interrupter contacts. The second opening of the contacts of interrupter 5520 opens the holding circuit for relay 5511 which releases, thus completing the first cycle of operation and release of relays 5510 and 5511. This action of relays 5510 and 5511 continues as long as relay 5512 remains operated and maintains ground on the armature of interrupter 5520.

Upon the second closure of the contacts of interrupter 5520, when relay 5510 releases but relay 5511 is still held operated, a circuit is closed for operating relay 5501, over the back contacts of relays 5502, 5504 and 5506, upper front contact of relay 5511, lower back contact of relay 5510 to ground on conductor 4831. Relay 5501, in operating, locks over its inner upper front contact to ground at the outer lower front contact of relay 5512.

Upon the operation of relay 5501, indicating the termination of the subsidiary timing interval, a circuit is completed from battery through the winding of relay 5432, over conductor 5433, and the outer upper front contact of relay 5501 to conductor 5523. Conductor 5523 is grounded, as described in the Carpenter application, until the transfer of the incoming information to the decoder has been completed. If this transfer is unduly delayed, relay 5432 is operated and causes the trouble indicator to be called in, as will be set forth hereinafter.

Assuming that no such delay was encountered, relay 5501 operates, but, since ground has been removed from conductor 5523, relay 5432 does not operate. As long as relay 6001 remains released and thereby indicates that the marker has not yet established connections to the office and district frames and to the district junctor, relay 5512 remains operated and relays 5510 and 5511 continue to function under the control of interrupter 5520 and the ground on conductor 4831. When relay 5510 operates for the second time at the start of the second cycle, relay 5502 operates in a circuit from battery through its winding, lower front contact of relay 5501, back contacts of relays 5503 and 5505, inner upper back contact of relay 5511, lower front contact of relay 5510, to the ground on conductor 4831. Relay 5502 locks over its lower front contact to ground supplied over the middle upper front contact of relay 5501.

Relay 5511 is operated by the opening of the interrupter contacts and relay 5510 is released by the subsequent closure of the interrupter contacts. With relay 5511 operated and relay 5510 released, relay 5503 operates in a circuit from battery through its winding, over the upper front contact of relay 5502, back contacts of relays 5504 and 5506, upper front contact of relay 5511, lower back contact of relay 5510, to the ground on conductor 4831. Relay 5503 locks to ground over the middle upper contact of relay 5501.

The next operation of relay 5510 completes a circuit for relay 5504; the next release of relay 5510 closes a circuit for relay 5505 and the subsequent operation of relay 5510 operates relay 5506. Relays 5504, 5505 and 5506 all lock under the control of relay 5501.

The total time measured from the grounding of conductor 4831 to the operation of relay 5506 is approximately eight seconds. Within this interval the marker should complete the reception and translation of the office code and establish connections with the office and district frames and district junctor. If it fails to do so and relay 6001 remains unoperated, to permit relay 5506 to operate, a circuit is closed from battery through the winding of relay 5432, conductor 5433 to ground at the outer lower contact of relay 5506. Relay 5432 causes the trouble indicator to be called in.

Under normal conditions, when the marker has connected to the frames and district junctor, relay 6001 is operated, opening the locking circuit for relay 5512. Relay 5512 releases, opens the locking circuit for relay 5501 and opens the circuit from the grounded control conductor 4831 to the armature of interrupter 5520, thereby releasing relays 5510 or 5511, or both, if they are operated at the time. The release of relay 5501 in turn releases which ever of the relays 5502, 5503, 5504, 5505 and 5506 had operated and locked prior to the release of relay 5512. When all of these relays have released, a circuit is completed for operating relay 5513 in order to shift from the first to the second interval of the timing circuit. The operating circuit for relay 5513 is traceable from battery through its winding, over conductor 5524, lower front contact of relay 6001, conductor 6050, back contacts of relays 5512, 5501, 5505, 5511, and 5510 to the ground on the timing control conductor 4831. In operating, relay 5513 locks through its winding, conductor 5524, front contact of relay 6001, conductor 6050 and over its lower middle front contact to the ground on conductor 4831. This ground is also extended to the armature of interrupter 5520. Ground over the upper front contact of relay 5513 operates relay 5504 in an obvious circuit. Relay 5504, in operating, completes a circuit from the front contact of relay 5511, over the back contact of relay 5506 and its own front contact to the winding of relay 5505 so that the latter relay will operate, instead of relay 5501 as before, upon the subsequent operation of relay 5511 under control of interrupter 5520.

The next closure of the contacts of interrupter 5520 releases relay 5510 but holds relay 5511. Since relay 5504 is now operated, relay 5505 is operated by the release of relay 5510 while the subsequent reoperation of that relay causes relay 5506 to operate and in turn operate relay 5432. The interval between the operation of relays 5513 and 5506 is approximately three seconds.

When no trouble is encountered, the marker normally releases within this second timing interval and by the removal of ground from conductor 4831 releases all of the operated timing circuit relays unless conductor 4831 has again been grounded due to the marker having been seized by an overlapping call.

Following the operation of relay 5506 at the conclusion of either timing interval, relays 5510 and 5511 continue to function and will operate relay 5507 if there is sufficient delay in the connection to the trouble indicator. Relay 5507 locks directly to conductor 4831, operates an alarm and identifying lamp and grounds conductor 2644 for the purpose of transmitting a trouble release indication to the sender through the district junctor.

As indicated above, the marker is arranged for overlap operation, that is, while it is engaged with its marker functions on one call, another sender may connect to it and a second call may progress through the decoder stage of the marker's operation. At the time that the second sender is connected to the marker, the marker connector connects ground to control conductor 4831 thus overlapping the ground which may still be connected to that conductor in connection with the first call. However, when the marker has completed the first call and releases the district frame, relay 6001 releases, thereby opening both the operating and locking circuits of relay 5513. Relay 5513 releases and, in turn, releases relays 5504, 5505, 5506, 5510 and 5511 if operated, restoring the timing circuit to normal. Now, with relay 6001 released, as above, the ground connected to conductor 4831 in connection with the second call causes relay 5512 to operate. From this point on the timing of the second call proceeds in the manner identical with that described above.

*Connection of marker to trouble indicator*

When relay 5432 operates as above described, it closes an obvious circuit for relay 5413. This completes a circuit from battery through resistance 5437, lower outer front contact of relay 5413, lower back contact of relay 5434, conductor 5438, winding of start relay 7900 of the trouble indicator circuit to ground. Start relay 7900 is individual to the marker shown, other start relays 7901 and 7902 being associated with other markers. These start relays are arranged in a preference chain which allows but one marker to connect to the trouble indicator at any time.

Relay 7900 operates over the above-traced circuit and, assuming that no other start relay in the chain is operated, a circuit is completed from ground at the left inner back contact of relay 1800, right outer back contact of relay 1407, conductor 1410, left back contact of relays 7902 and 7901, left front contact of relay 7900, conductor 7903, to battery through the winding of multicontact connecting relay 2002 which operates, and in turn connects ground to conductors 2005, 2006, 2007, 2008 and 2009 thereby operating other multicontact relays 1601, 2000, 302, 300, 800, 2001, 2004, 1200, 2003 and 1600. In addition, relay 2002 closes a circuit from ground at the right back contact of relay 1801, conductor 1802, uppermost contact of relay 2002, conductor 2010, windings of relays 6517, 6836 and 6716 and battery. These relays, which are located in the marker circuit, separate the leads over which the marker transmits information to the sender and also disconnect them from the trouble indicating relays so that they may be tested individually for false ground and crosses. When relays 6517, 6836 and 6716 have all operated, a chain circuit is closed from ground on conductor 2006, left front contacts of relays 6517, 6836 and 6716 to conductor 1283 and the windings of relays 301, 303, 801, 1202 and 1603. Relays 1201 and 1602 are not operated at this time, being used only when the trouble indicator is used to test the marker. The operation of the connecting relays closes through numerous conductors extending from various points in the marker to the recording equipment of the trouble indicator itself.

Relay 5413, operating as above, also connects ground over its inner upper front contact to conductor 5440 which extends over the upper back contact of relay 5318 to conductor 5330 which causes the operation of the register which records the fact that the individual marker has timed out and connected to the trouble indicator. There is a similar register for each marker in the office. Relay 5432 connects ground to conductor 5441 which extends over the lower back contact of relay 5318 to conductor 5331 to sound a minor alarm. Relay 5413 also connects ground to conductor 5442 which extends to battery through the winding of relay 1804 which is individual to this marker in the trouble indicator and controls the lighting of lamp 7910 which is lighted when the marker attempts to seize the trouble indicator and finds it busy.

The operation of multicontact connecting relay 2001 connects ground to conductor 2011, operating relay 1807 which locks over its left inner front contact to ground at the left outer back contact of relay 1800. Relay 1807 connects ground over its right inner contact to lamp 1831 in preparation for lighting that lamp to indicate the particular marker from which the record is being taken. It also disconnects ground from the circuit of lamp 7910 and connects ground over its right outer contact and the right second back contact of relay 1810 to conductor 1808 to start the trouble indicating alarm. In addition, it closes a circuit from ground over its left middle contact and the left inner back contact of relay 1407 to the winding of relay 1811 and battery.

If, during the time that the trouble indicator is held by this marker, other markers attempt connection with the trouble indicator, they will operate the relay 1804 individual thereto. However, because the chain is open they cannot operate the relay corresponding to relay 7900, cannot operate the indicator connecting relays and therefore cannot operate relay 1807. With relay 1807 deenergized and relay 1804 operated, the circuit of the lamp corresponding to lamp 7910 is closed to the armature of relay 1404 which will supply battery to the lamp circuits when lamp key 1406 is operated.

The operation of relay 1811 closes a circuit from ground over its left contact through resistance 1812 to the winding of relay 1813 and battery. With relay 1813 operated, which occurs after an interval due to the slow-to-operate character of that relay, a circuit is closed over the right contacts of relay 1813 through the winding of relay 1407 and battery. Relay 1407 locks over its innermost left contact to ground at the middle left contact of relay 1807. Relay 1407 at its second and third left front contacts closes operating circuits for relays 1403 and 1405 which, in turn, supply locking ground for the recording relays over conductors 1411 and 1412. While only two locking circuits have been shown, in practice a larger number would be provided in order to care for the necessary current load.

The operation of relay 1407 opens the operating circuit for relay 1811 which releases after an interval measured by the slow-to-release character of relay 1811. Relays 1811 and 1813 are made slow to release and slow to operate, respectively, for the purpose of timing the period during which the recording relays should operate, after which the trouble indicator disconnects from the marker and signals it to transmit a trouble release signal to the associated sender and return to normal.

The release of relay 1813 closes a circuit from ground at its left back contact, inner right front contact of relay 1407, outer right back contact of relay 1810 to the winding of relay 1814 and battery. Relay 1814 locks over its left contact to grounded conductor 1411 and closes a circuit from ground over its right front contact through the winding of relay 1805. Relay 1813, in operating, connected ground over its outer right contact to the chain of preference relays 7900, 7901 and 7902 to supplement ground furnished by relay 1407 and also to hold the marker multicontact relays operated when the original operating circuit is opened by the operation of relay 1407. Therefore with relay 1813 released, the holding circuit for the multicontact relays is opened and these relays release, disconnecting the trouble indicator from the marker.

Relay 1805, in operating, connects ground over its contacts to conductor 1806 and the corresponding conductors belonging to all other markers associated with this trouble indicator. Ground connected to conductor 1806 extends over the outer right back contact of relay 7918 to conductor 5439 and the upper winding of relay 5434. Relay 5434 operates and locks in a circuit through its lower winding and lower front contact to ground over the middle upper front contact of relay 5413. The operation of relay 5434 completes a circuit from ground at the lower back contact of relay 5507, outer upper front contact of relay 5434, second lower front contact of relay 5413, upper back contact of relay 5507 to trouble release conductor 2644 which is extended under the control of relay 6001 through the marker connector to the sender if the marker is in its decoding stage and through the district connector, district junctor and sender link circuits to the sender if the marker is in its marking stage. Relay 5434 also connects ground over its inner upper front contact, inner lower front contact of relay 5413 to the marker release conductor 5734 to complete the release of the marker.

After the release of the marker, relay 1807 remains locked under the control of relay 1800 thereby preventing the release of relays 1407, 1405, 1814, 1805 and therefore the recording relays until the release key 1409 is operated.

The operation of relay 5434 opens the circuit of relay 7900 and the operation of the corresponding relay in other markers which may have attempted connection with the trouble indicator restores the other relays of the chain.

During the time that the multicontact connecting relays are operated in the decoder marker, the recording leads are closed to the trouble indicator. Each recording lead is associated with a relay or lead in the marker and if grounded operates the associated recording relay in the trouble indicator circuit. Before the connecting relays are released and the recording leads are disconnected the operated recording relays are locked by the operation of relays 1403 and 1405 as already described. Each recording relay prepares a path for lighting a lamp which is so designated as to identify the particular function associated with its recording lead in the marker. In a few cases the operation of the recording relay opens the lighting circuit of the lamp as it is necessary to use the absence of ground on the recording lead to indicate the operation of the relay in the decoder marker. The lamps are lighted to display the recorded information by the operation of lamp key 1406 which locks and operates the lamp relay 1404. Relay 1404 connects battery to all of the recording lamps over conductors 1413 and 1414 which may be taken to represent such a plurality of circuits as are necessary to carry the current load. With battery connected to each lamp those which are grounded as the result of the operations or non-operation of the recording relay will light, thus displaying the information taken from the decoder marker.

To wipe out the record and return the trouble indicator to normal the release key 1409 is momentarily operated, operating relay 1806 which locks under the control of relay 1407. The operation of relay 1806 opens the locking circuits of relays 1807 and 1804 and they release. The release of relay 1807 releases relay 1407. If there are any relays such as relay 1804 operated, other than the one associated with the marker from which the record was taken, their associated lamps will be extinguished when the relays release. The release of relay 1407 releases relays 1405, 1403, 1816, 1805 and 1404, if the lamp key 1406 is locked in the operated position, and restores ground to the decoder start relay chain circuit for operating the multicontact relays in the associated markers. The release of relay 1404 extinguishes the display lamps and the release of relays 1403 and 1405 releases all of the recording relays, returning the circuit to normal. The release of relay 1805 releases relay 5434 in all markers, thereby removing the busy condition from the trouble indicator.

The originating markers are arranged to decode a second call while completing the marker functions for the preceding call. Therefore there may be one or two calls in the marker at the time the trouble indicator is summoned. When there are two calls, the one in the decoder stage cannot cause the trouble indicator to be summoned if it encounters trouble until after the preceding call in the marker stage has been completed. Therefore, when the trouble indicator is summoned while there are two calls being handled, the trouble is in the marker stage in connection with the completion of the first call. In order to allow a second call to enter the marker before a first call has been completed, the marker is arranged to release the decoding apparatus when it advances into the second stage. Thus when it transmits a release signal to the sender the marker connector releases. Therefore, when the trouble indicator is summoned after the marker has advanced to the second stage, the record taken may not show the code and class of service information that was recorded on the receiving relays or the sender, decoder connector and connector frame numbers for this call. However, if another call has entered the first stage of the marker this information will be recorded for the second call.

Whether one or two calls are being handled by the marker can be determined from lamps 230 and 242 shown in Fig. 2. Relay 200 operates and prepares a path for lighting its associated lamp when there is a ground on conductor 4622 of the marker indicating that the sender is connected. Relay 212 operates and prepares a path for lighting its associated lamp 242 when there is ground on conductor 5450 of the marker indicating that a call is being handled in the marker stage.

When lamp 230 lights and lamp 242 does not, it indicates (a) that a sender is connected with the marker; (b) that there is only one call being handled by the marker; (c) that the trouble encountered by the marker is in the decoder stage.

When lamp 242 lights and lamp 230 does not, it indicates (a) that a sender is not connected with the marker; (b) that there is only one call being handled by the marker; (c) that the marker has advanced to the marker stage; (d) that the trouble indicated is in the marker stage of the operation of the marker.

When relays 230 and 242 both light it indicates (a) that there are two calls being handled by the marker; (b) that a sender is connected with the marker; (c) that the trouble encountered by the marker was in the handling of the first call in the marker stage.

Information given by lamps when lighted

The following is a list of the lamps that display the recorded information, together with their indications:

Lamp 1831 is lighted by the operation of relay 1807 as above described and indicates the marker circuit from which the record was taken. There is one of these lamps for each marker.

Figure 18:
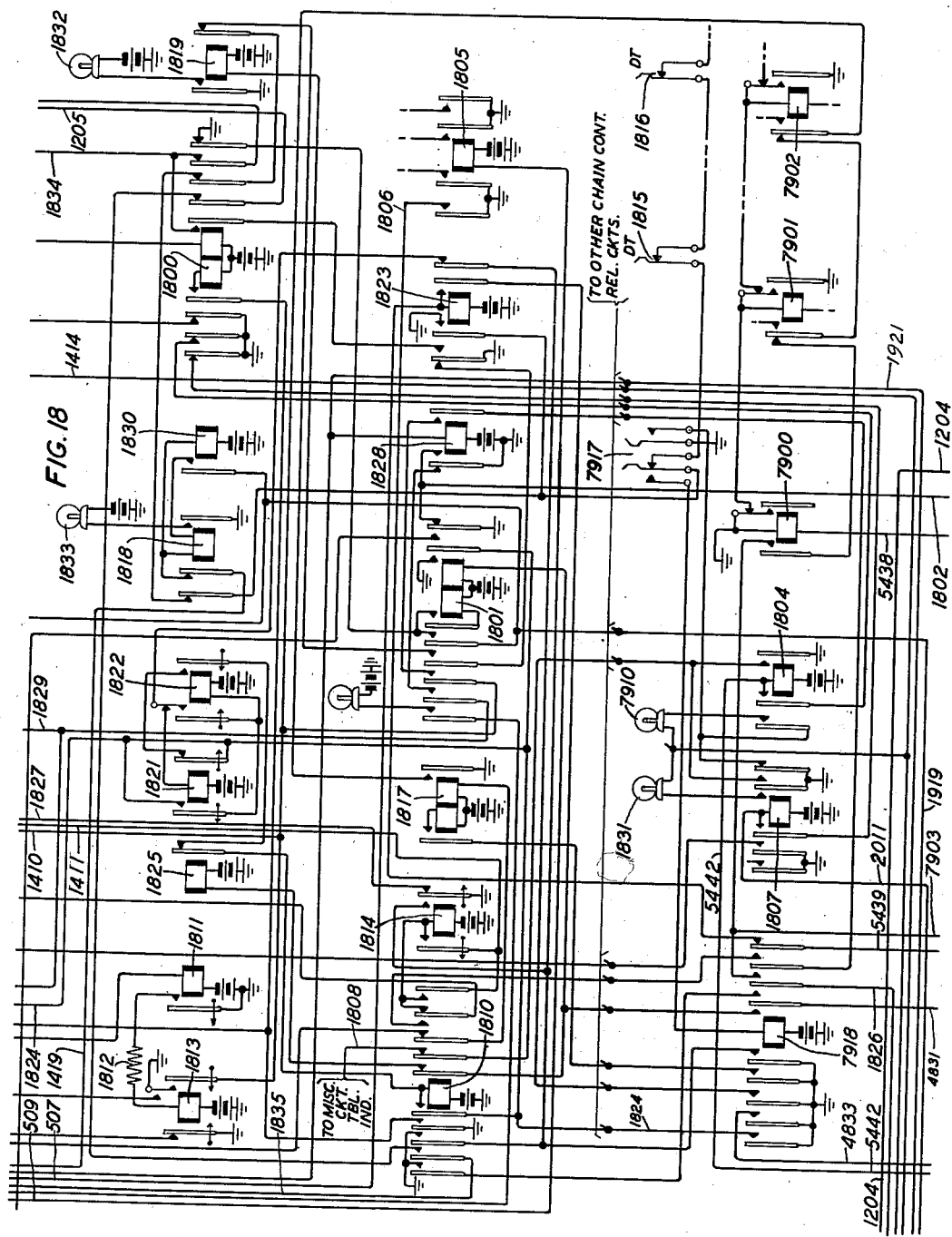

Lamp 7910 (Fig. 18) is lighted under the control of relay 1804 as above described and indicates the markers that fail and that release without a record being taken while the trouble indicator is busy. There is one of these lamps for each marker served by the trouble indicator.

Lamps 2160 to 2169 indicate the frame on which the marker connector circuit is located. There is one of these lamps for each marker connector frame and the information is received directly from the marker connector over conductor 4746, etc.

Lamps 2180 to 2182 indicate the marker connector on the particular frame, there being one lamp for each marker connector on any one frame and the information is received from the marker connector over conductor 4747, etc.

Lamps 2170 to 2179 indicate the sender in a marker connector group. There is one of these lamps for each sender associated with one marker connector circuit. The information is transmitted directly from the marker connector over conductor 4745, etc.

Lamps 400 to 405, 420 to 425 and 440 to 445 indicate the office code as received by the marker from the sender. The lamps of each group are numbered 0, 1, 2, 4 and 5, respectively, and where more than one lamp is lighted, the numbers are added to determine the digit recorded.

Lamps 900 to 908 indicate the subscriber's class of service, the subscriber's sender group and whether or not it is a key pulsing sender. This information is taken from the marker receiving leads and indicates what information was transmitted by the sender.

Relays 920 to 925 and 930 indicate the district link frame number received by the marker from the sender. The lamps are numbered 0, 1, 2, 4, 5 and 10 and the numbers of lighted lamps are added to obtain the frame number.

Lamp 942 indicates that an alternate route was requested by the sender.

Lamp 945 indicates that an overflow trunk was requested by the sender.

Lamp 948 indicates that the call was originated by the tip party on a party line.

The following lamps indicate the information transmitted to the sender by the marker for the particular code received by the marker from the sender:

Lamps 1304, 1305 and 1306—office brush selection.

Lamps 1313 and 1314—stations delay condition.

Lamps 1326 to 1329—office group selection.

Lamp 1342—skip office selections.

Lamps 1704, 1705 and 1706—second office brush selection.

Lamps 1716 to 1719—second office group selection.

Lamp 1726—skip second office selections.

Lamps 1741 to 1747—compensating resistance condition.

Lamps 1765 to 1768—class of call.

Lamp 1782—two-wire trunk to be included in the circuit.

Lamps 2100 to 2109 indicate the frame number of the district link connector as translated by the marker from the information received from the sender.

Lamps 2110 to 2119 indicate the number of the office link and connector frame relay operated in the marker.

Lamps 2190 to 2199 indicate the select magnet operated in the district primary switch level and therefore the district link primary switch level.

Lamps 2190A to 2199A indicate the district link primary switch and the district link secondary switch level. Together the last two sets of lamps indicate the number of the district junctor circuit and the district frame. These indications are taken directly from the district link and connector circuit connected to the decoder marker at the time the record is taken.

Lamps 2140 to 2159 indicate the intermediate trunk channel selection relay operated in the marker, from which may be determined the district link secondary switch and the office link primary switch.

Lamps 2120 to 2134 indicate the outgoing trunk level relay operated in the marker.

Lamps 1540 to 1579 indicate the outgoing trunk selection relay that is operated in the marker and from this indication the office link primary switch level and the office link secondary switch can be determined. There are forty of these lamps, one for each corresponding relay in the marker.

Lamps 2183 to 2186 indicate the ground supply relays operated in connection with the route relays in the marker.

The following lamps indicate the zone charge and transmission relays that are operated in the marker:

Lamps 1130 to 1139—zone charge relays.

Lamp 1140—permanent signal relay.

Lamp 1141—no charge relay.

Lamp 1142—operator's talking relay.

Lamp 1143—talking charge relay.

Lamp 1144—tip party.

Lamp 1145—ring party.

Lamp 1146—zone charge checking relay.

Lamp 1147—talking charge checking relay.

Lamp 1148—tip party checking relay.

Lamp 1149—zone charge checking relay.

Lamp 1150—zone charge locking lead.

Lamp 1151—zone charge overflow lead.

The following lamps indicate which trouble relays are operated in the marker circuit. These relays are operated and block the marker from completing the call when the leads they test are falsely grounded or crossed.

Lamp 722 indicates that both windings of the office brush transmitting relay are energized.

Lamp 723 indicates that both windings of the office group transmitting relay are energized.

Lamp 724 indicates that both windings of the second office brush transmitting relay are energized.

Lamp 725 indicates that both windings of the second office group transmitting relay are energized.

Lamp 726 indicates that both windings of the compensating resistance transmitting relay are energized.

Lamp 727 indicates that both windings of the class transmitting relay are energized.

Lamp 621 indicates that more than one trunk level relay is operated.

Lamp 622 indicates the operation of the master cross indicating relay.

Lamp 623 indicates a falsely grounded zone charge lead.

Lamp 624 indicates a false ground on the zone start or zone overflow lead.

Lamp 625 indicates the operation of more than one of the charge relays.

Lamp 626 indicates that one or more transmitting leads of the sender are falsely grounded.

Lamp 627 indicates a false ground on the charge control conductors leading toward the district junctor.

Lamp 728 indicates a false ground on the sleeve lead of the outgoing trunk selected by the marker.

Lamp 729 indicates a false ground on the auxiliary sleeve lead of the office link and connecter circuit.

Lamps 730 and 731 indicate false ground or cross-connection on the group start and group end conductors, respectively which would cause two or more of the group defining relays to operate.

Lamp 732 indicates a false ground on the sleeve leads of the district link, office link and office junctor.

Lamp 733 indicates a false ground or cross on a select magnet operating conductor.

Lamp 721 indicates a falsely grounded start or test lead associated with the sender test connector circuit.

Lamp 734 indicates a falsely grounded trunk level lead to the office link and connector circuit.

Lamp 628 indicates a falsely grounded lead to the office link and connector circuit over which the relay which selects the group of office primary select magnets is operated.

Lamp 629 indicates a false ground on the lead for testing the sleeve of the district junctor.

Lamp 630 indicates that the winding of two or more office frame relays in the marker are energized due to a cross or false ground returned to the marker by the selected office frame.

Lamp 631 indicates that two or more of the relays in the office link circuit which control the circuits of the secondary select magnets are operated.

Lamp 632 indicates a false ground on the conductor which transmits the split or non-split group information to the office link and connector circuit and on the leads which check the operation of the cut-through relays in both district and office link and connector circuit.

Lamp 633 indicates a false ground on the release or trouble release leads of the marker.

The lamps of Fig. 2 indicate the various functions of the decoder marker while it is handling a call and are used to show its progress. The function indicated by each lamp is as follows:

Lamp 230 indicates that a sender is connected with the marker.

Lamps 231 and 232 indicate a satisfactory check by the marker of the information received from the sender.

Lamps 233, 234, 235 and 236 indicate the operation of the relays in the marker which indicate to the marker whether the level of the switch and the office frame on which the chosen group of trunks are located is a split or non-split level and whether the frame has an even number or an odd number.

Lamp 237 indicates the presence of the ground which indicates the successful connection of the marker with the district frame.

Lamp 238 indicates the presence of the ground which tells the marker that the connection has been extended through the district link and connector to the district junctor.

Lamp 239 indicates the operation of the relay in the marker which operates if all of the trunk selection relays are released before the idle trunk is selected and later releases. Therefore, this lamp will only light in case the marker fails in attempting to select the trunk.

Lamp 240 indicates that the sender release checking circuit is closed through the transmitting relays.

Lamp 241 indicates that the circuit for operating a sender release relay is closed.

Lamp 242 indicates that the marker has released the sender and advanced to the marker stage.

Lamp 243 indicates that the connection between the marker and the office link and connector circuit has been completed.

Lamp 244 indicates the operation of the relay in a district link and connector circuit which connects the marker with the office junctors.

Lamp 245 indicates that the channel selection relays are released.

Lamps 246 and 247 indicate the operation of the relays which check for cross and double connections on the district and office hold magnets.

Lamp 248 indicates that the sleeve test circuit from the office link and connector circuit is grounded by the operation of the select magnet and the office secondary switch and that the corresponding relay in the marker should be operated.

Lamp 249 indicates that the sleeve test lead from the district link and connector circuit is grounded by the operation of the district primary switch select magnet and that the corresponding relay in the marker should be operated.

Lamp 250 indicates that the relay which tests for the operation of the district secondary and office primary holding magnets has been operated and that the marker has failed before it was shunted by the disconnection of the district junctor relay.

Lamp 251 indicates that a satisfactory check has been made of the message register control circuit.

Lamp 252 indicates that the secondary sleeve conductor of the outgoing trunk circuit has been grounded by the operation of the office secondary switch.

Lamp 253 indicates that the marker release relay has been operated and that trouble was encountered by the marker circuit which prevented it from returning to normal.

Figure 19:
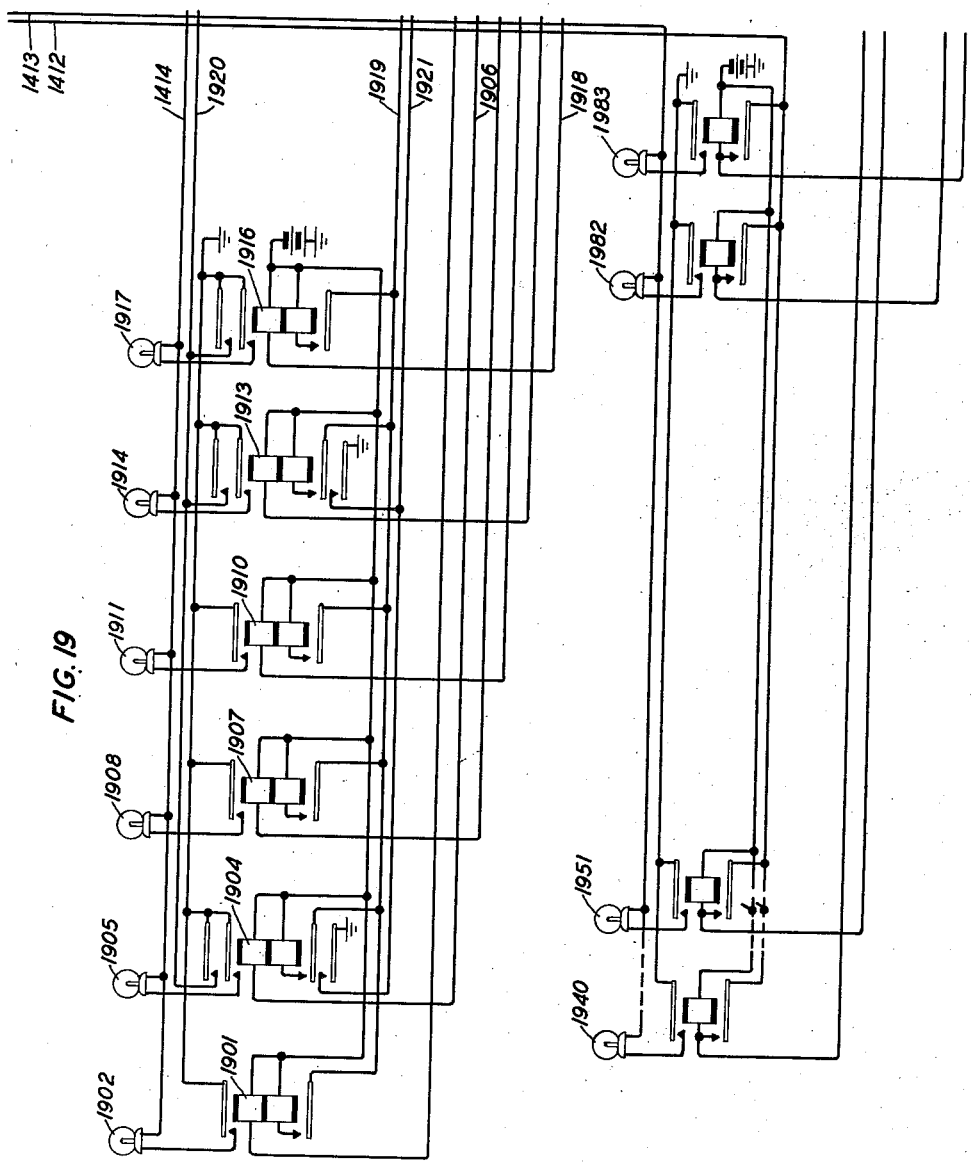
Figure 20:
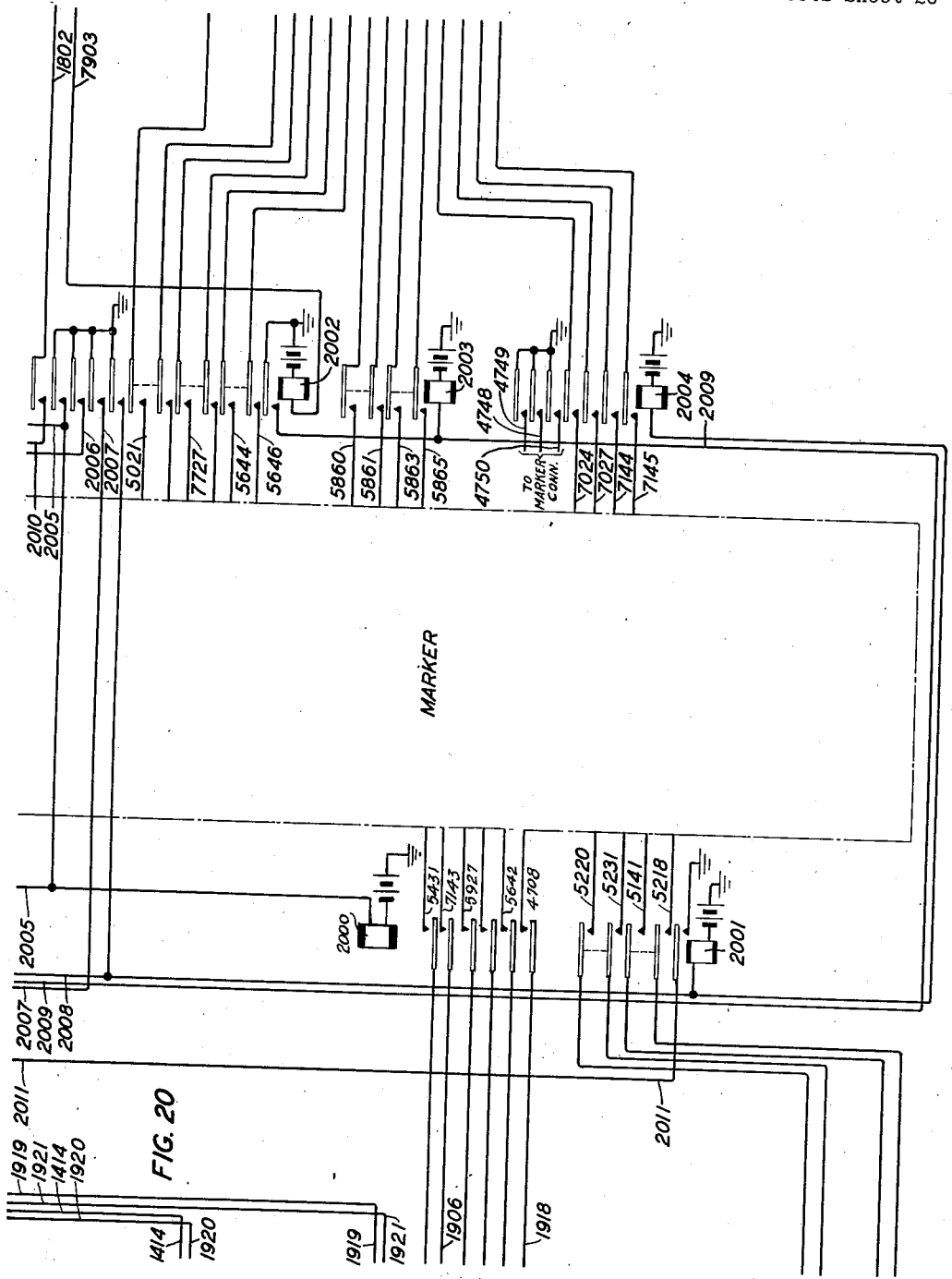
Figure 21:
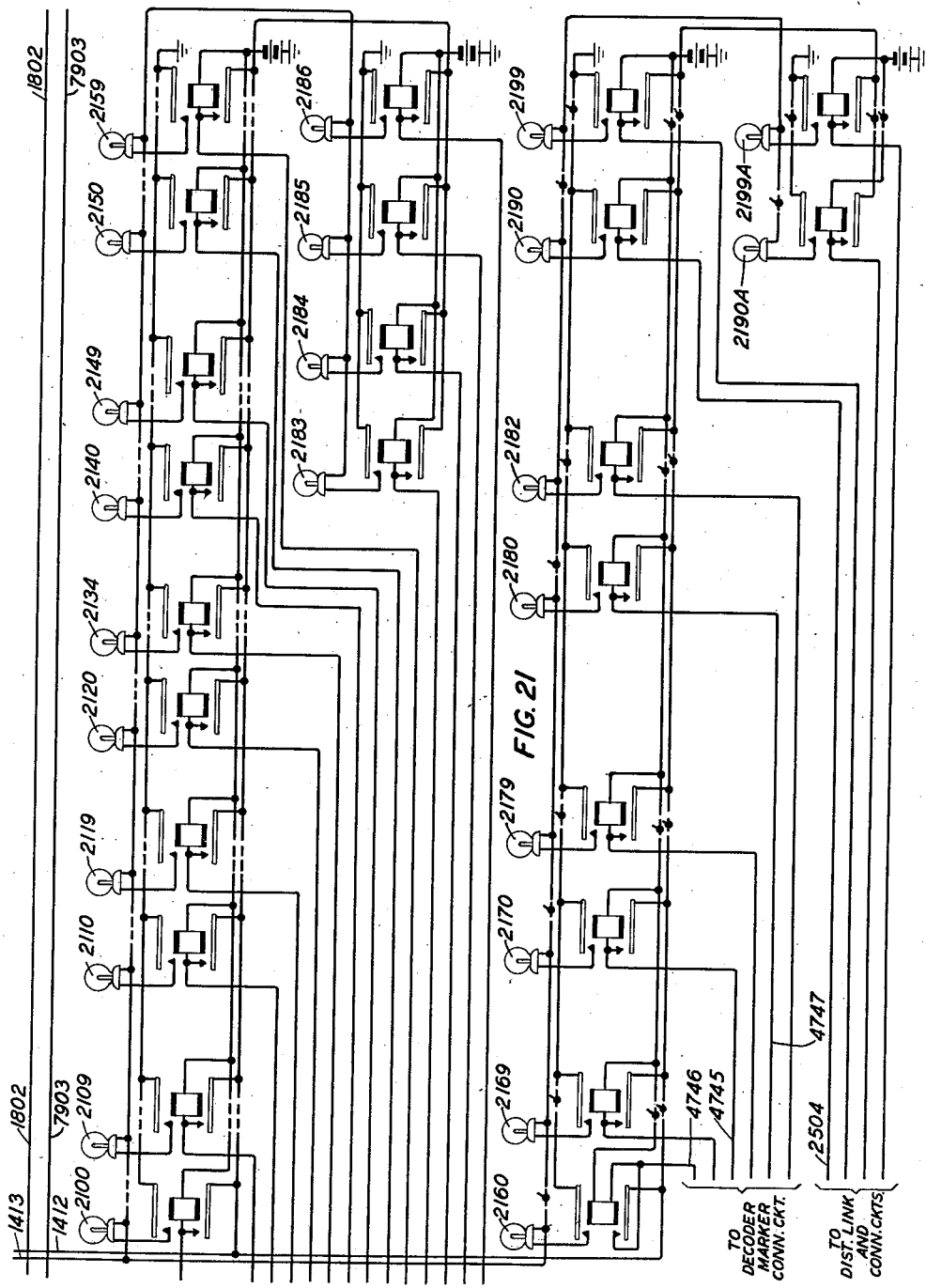

The lamps in the upper part of Fig. 19 indicate release conditions by the marker circuit. After encountering any of these conditions should the marker fail to release the trouble indicator will take a record and indicate by these lamps the particular condition under which the marker failed to return to normal. The lamps indicate the following:

Lamp 1902—message register lead open toward the district junctor circuit.

Lamp 1905—all trunks busy.

Lamp 1908—all channels busy.

Lamp 1911—trunk selected by the marker was also seized by a panel selector before it could be made busy.

Lamp 1914—reorder signal to the operator as a result of a denied code having been transmitted to the marker by a key pulsing sender.

Lamp 1917—This lamp is lighted only for test calls and indicates that the release lead of the marker is grounded thereby transmitting the sender release signal.

Lamps 1940 to 1951 indicate the trunk subgroup relay operated in the marker. These lamps locate directly the trunk subgroup for trunk groups divided into four or more subgroups.

Lamps 1982 and 1983 indicate the trunk subgroup advance relay operated in the marker when the trunk group is divided exactly into two subgroups.

*Marker testing circuits*

The trouble indicator circuit in addition to taking records of service calls when summoned by a marker, is provided with means for originating test calls and recording the progress of the calls through the marker circuit.

Figure 4:
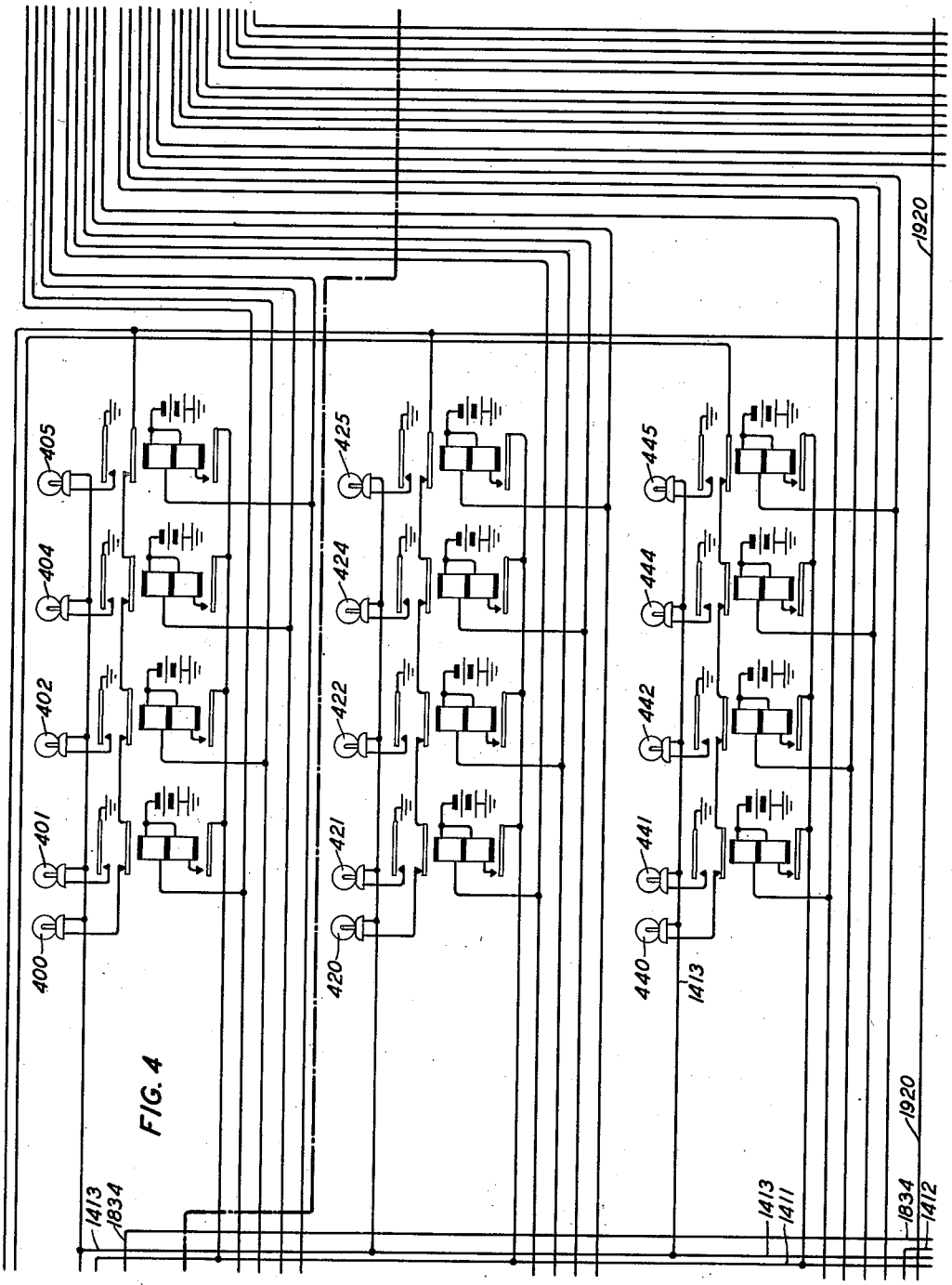
Figure 5:
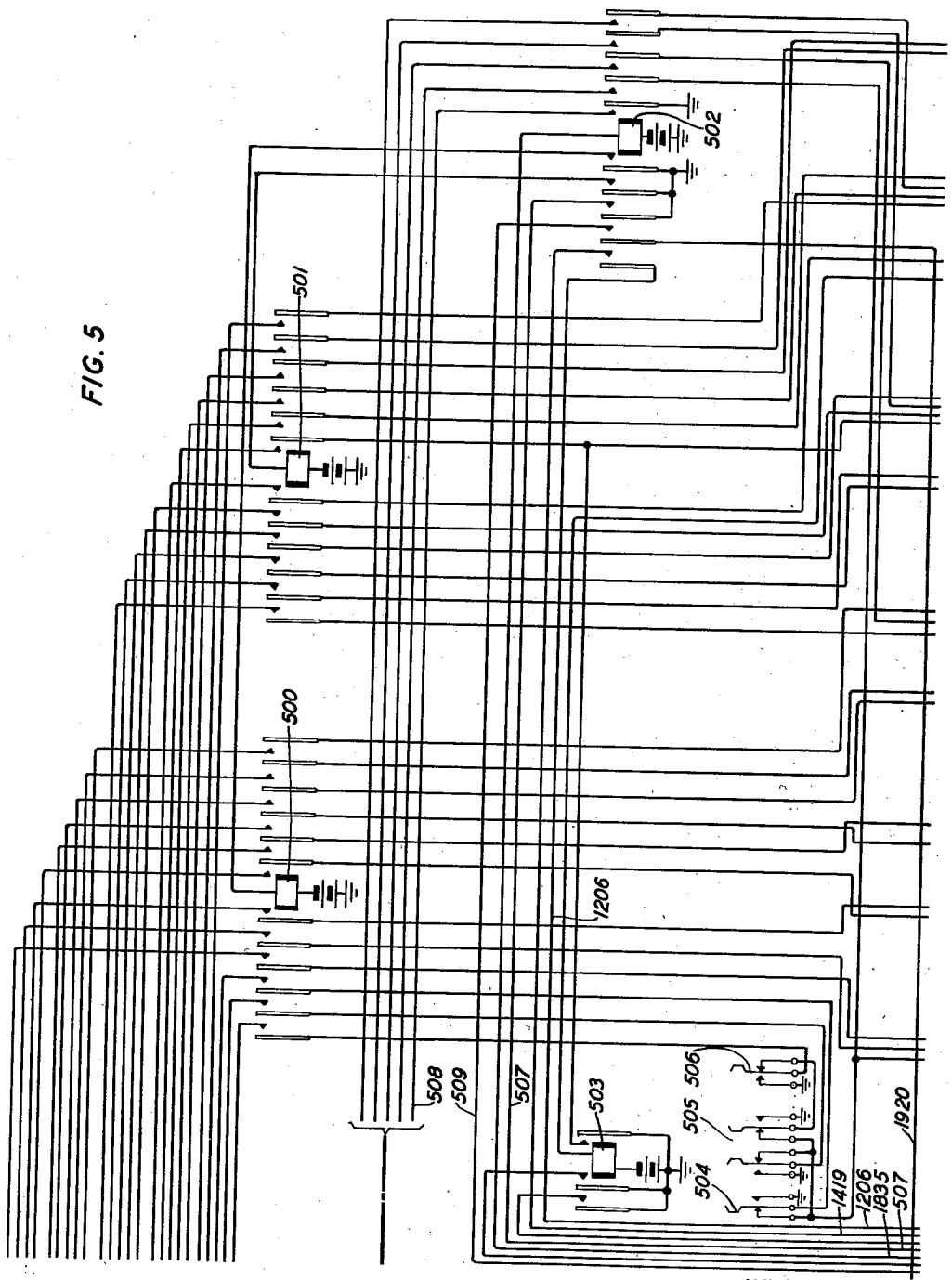
Figs. 5, 10, 14 and 18 show the circuits comprising the testing equipment of the trouble indicator.
Figure 6:
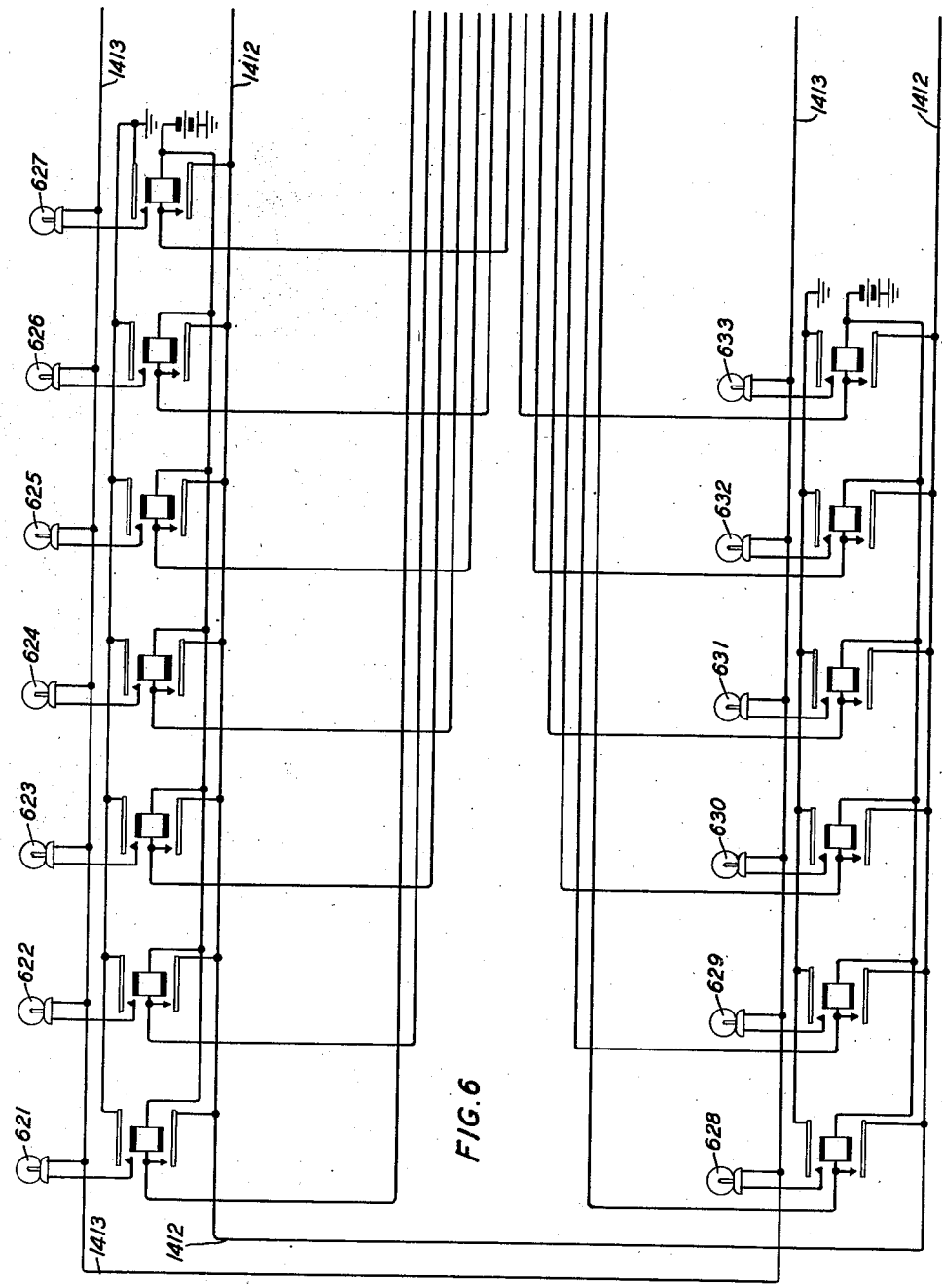
Figure 7:
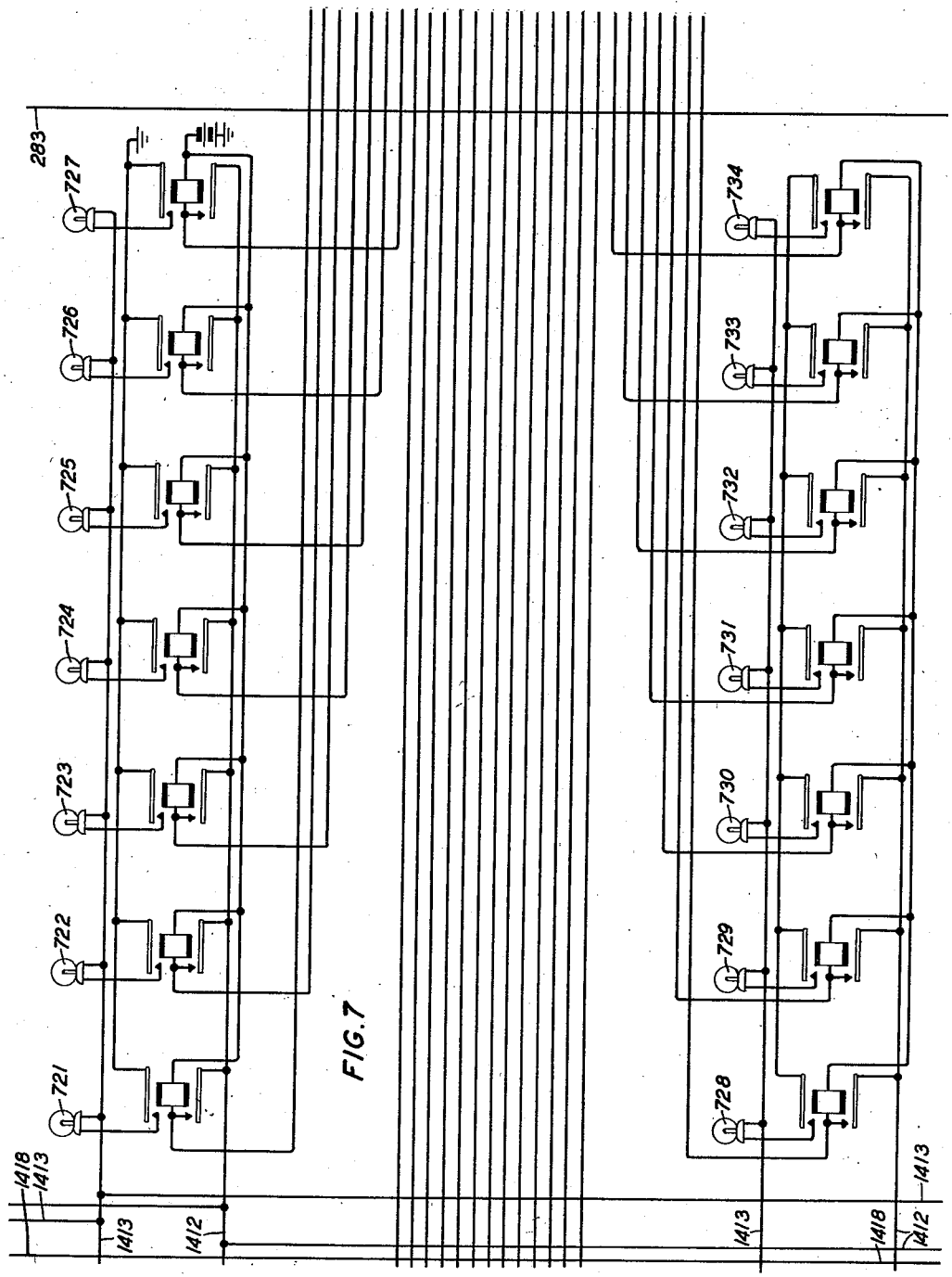
Figure 8:
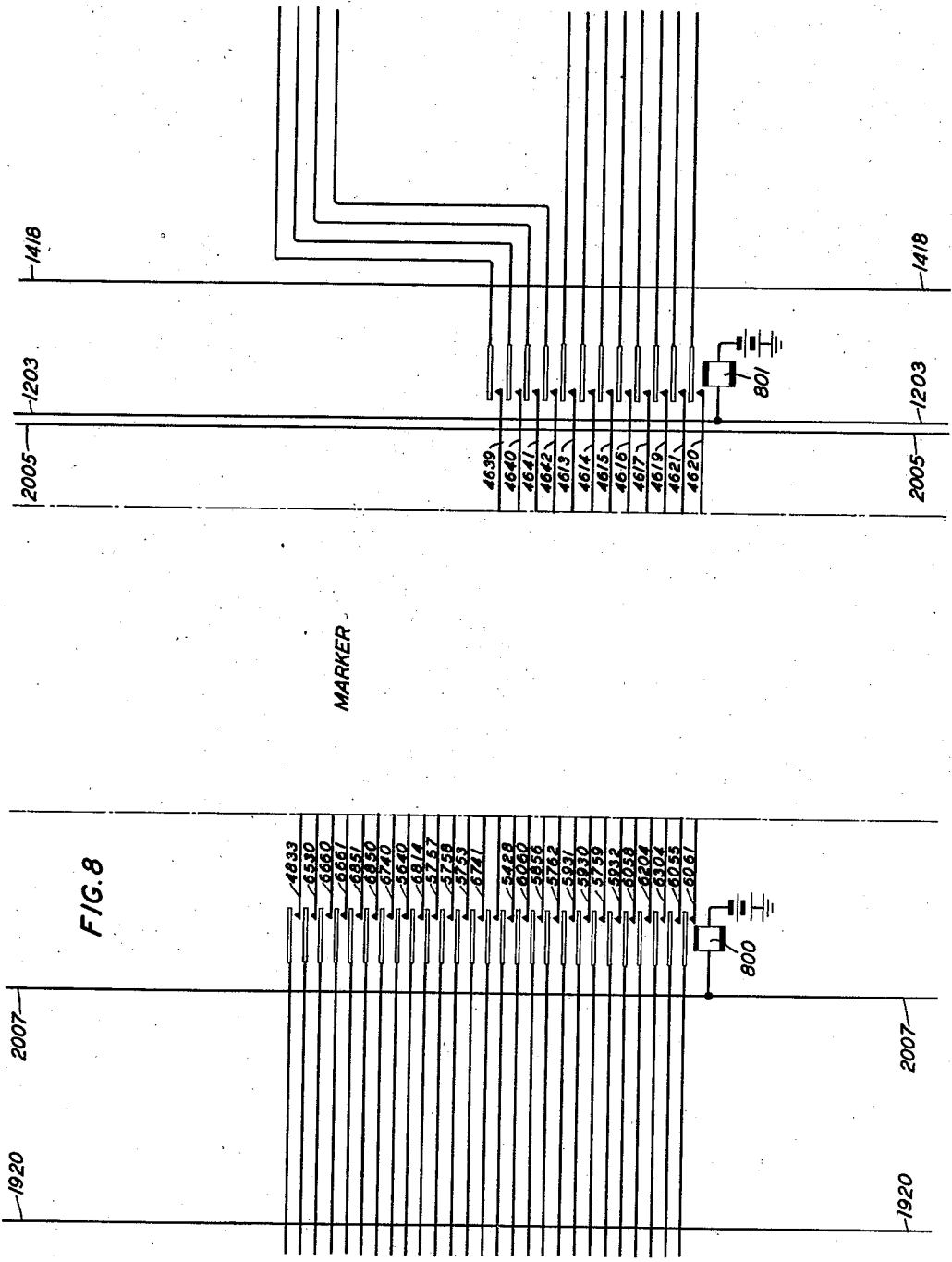
Figure 9:
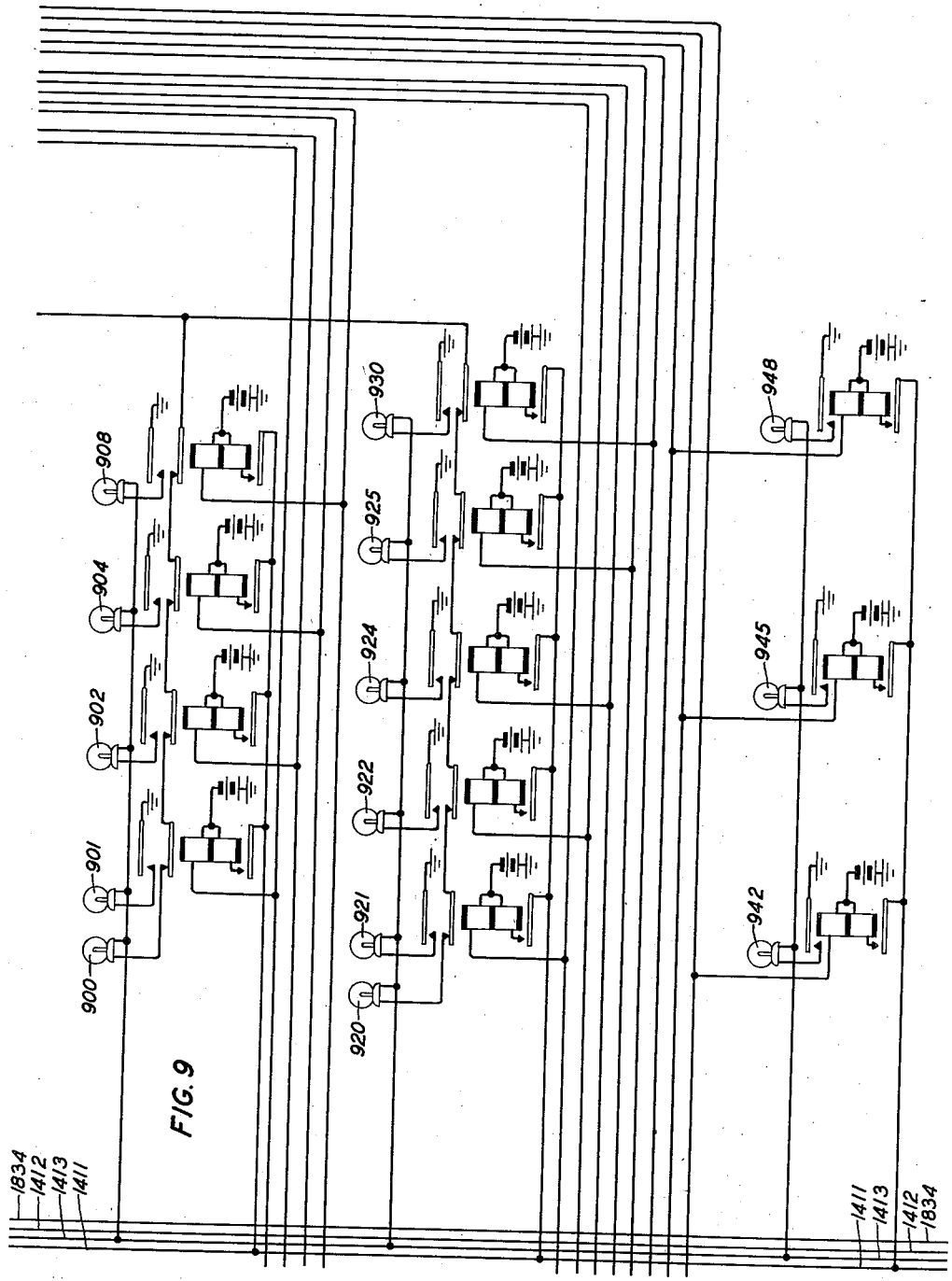
Figure 10:
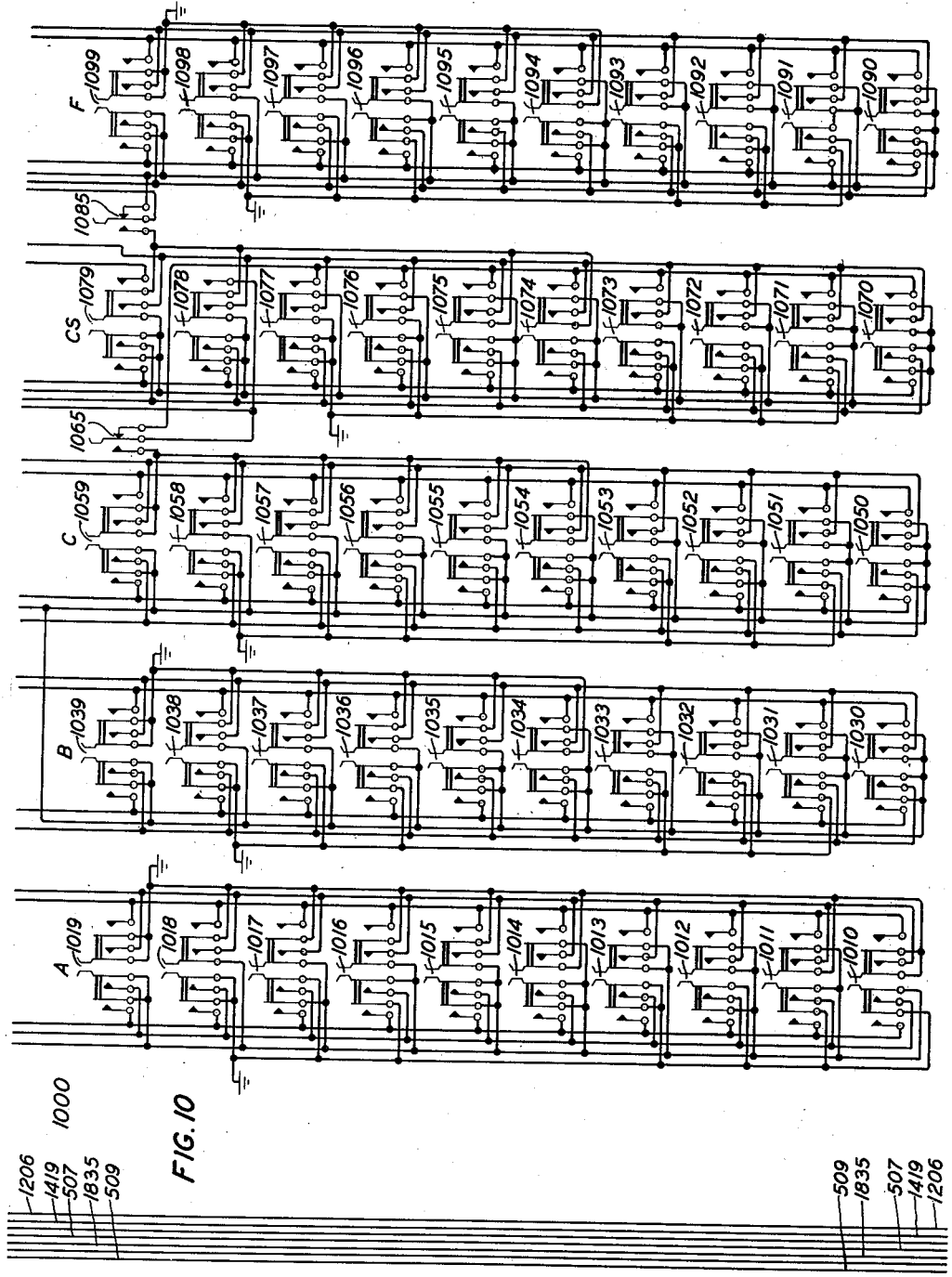
Figure 11:
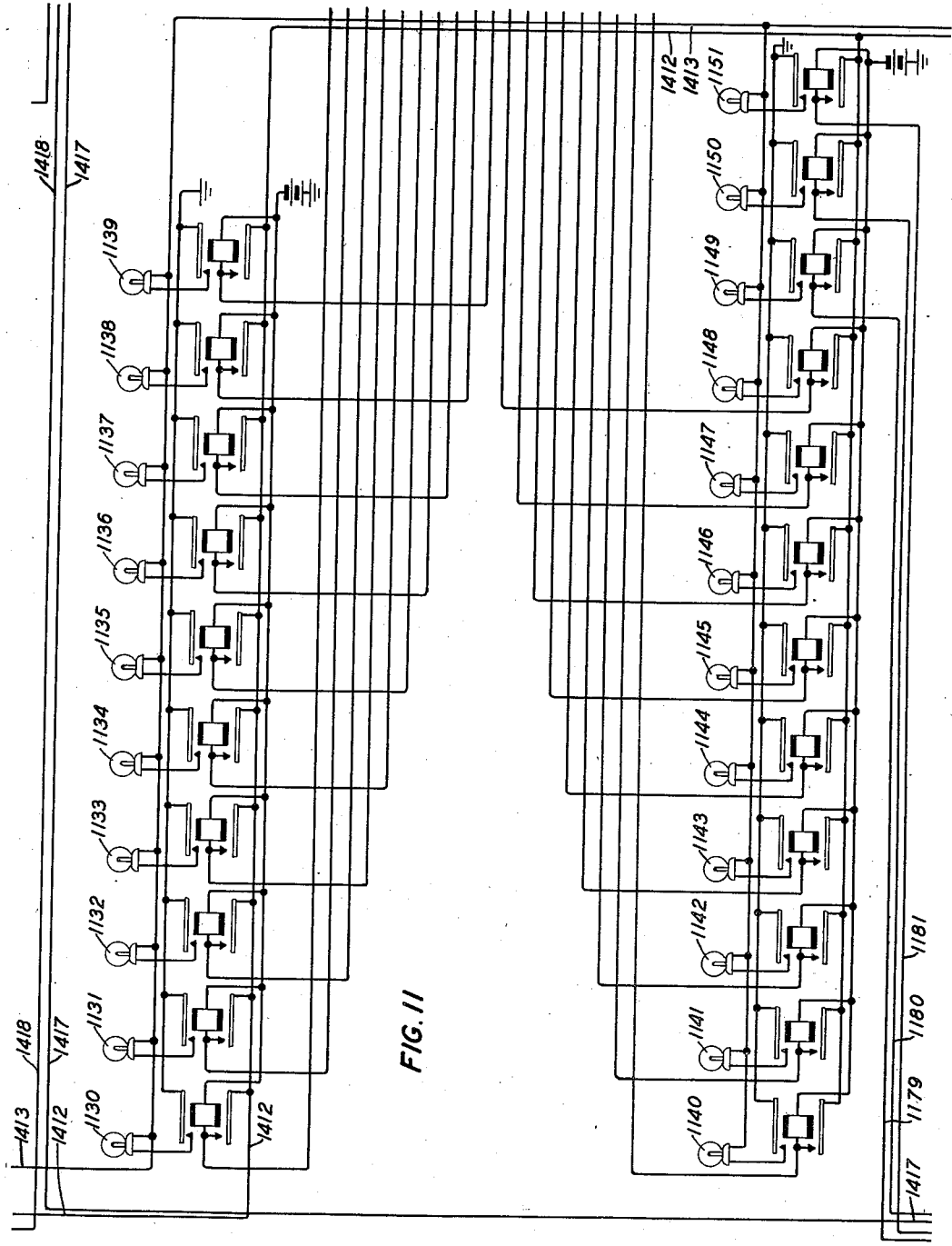
Figure 12:
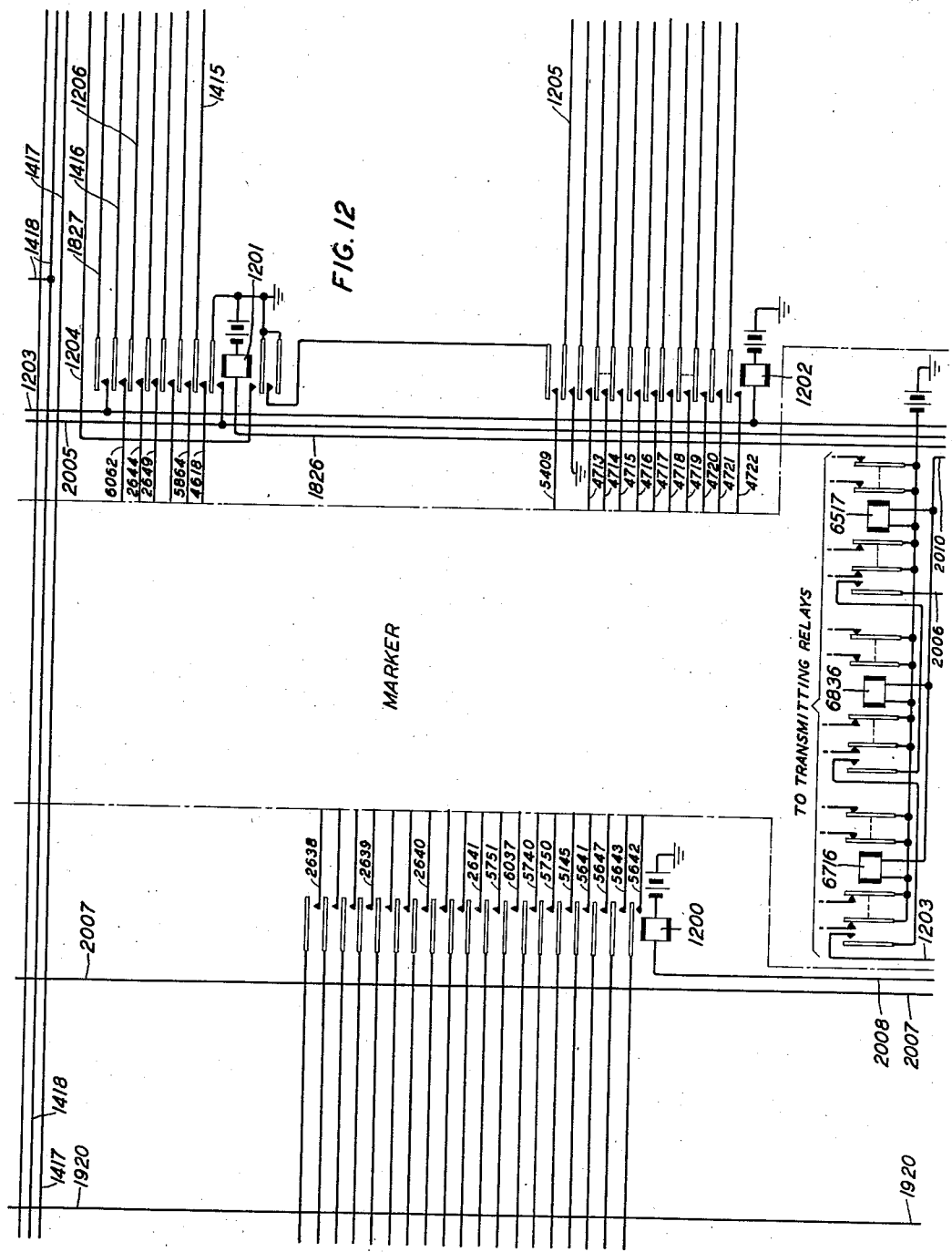
Figure 13:
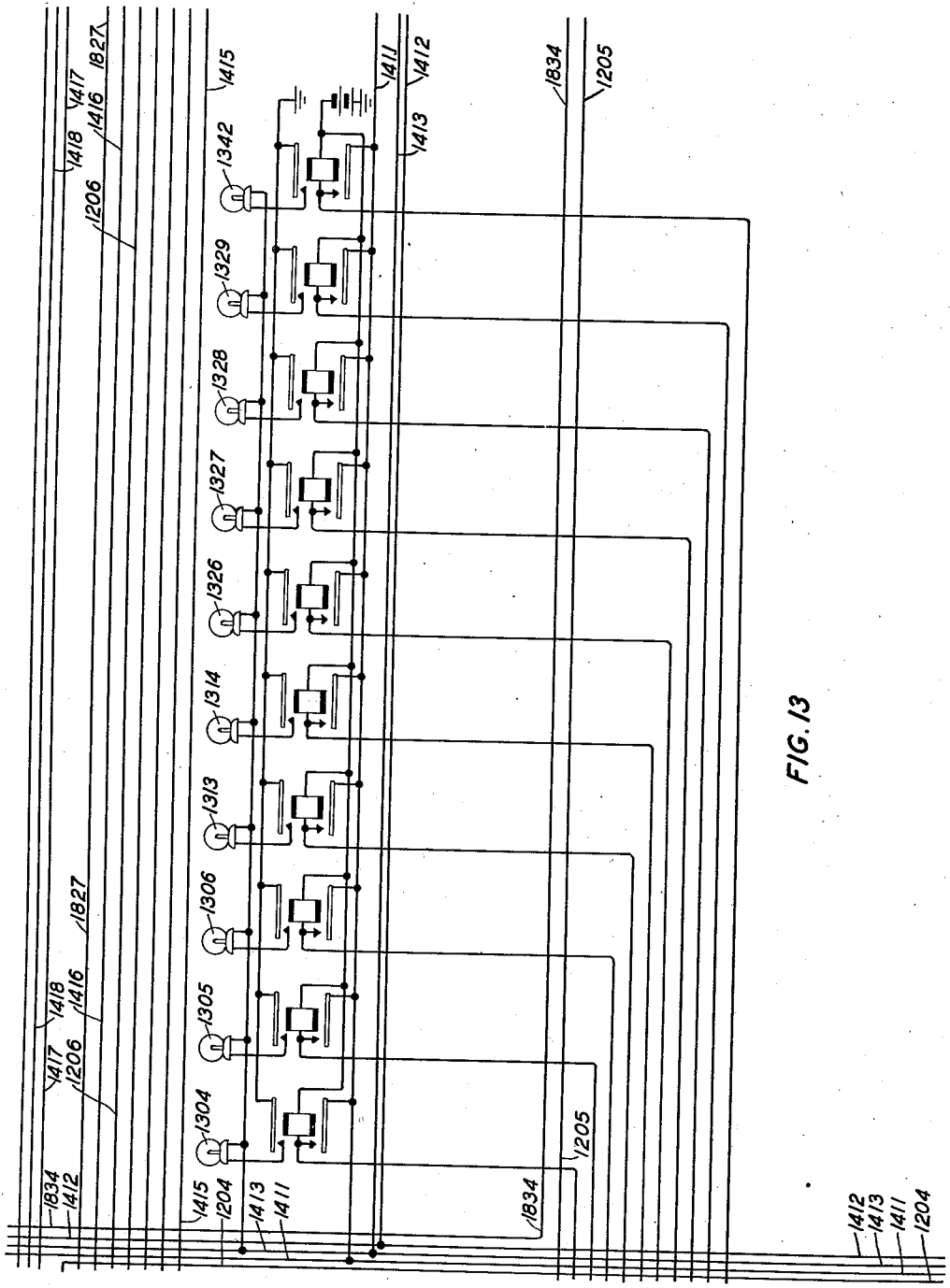
Figure 14:
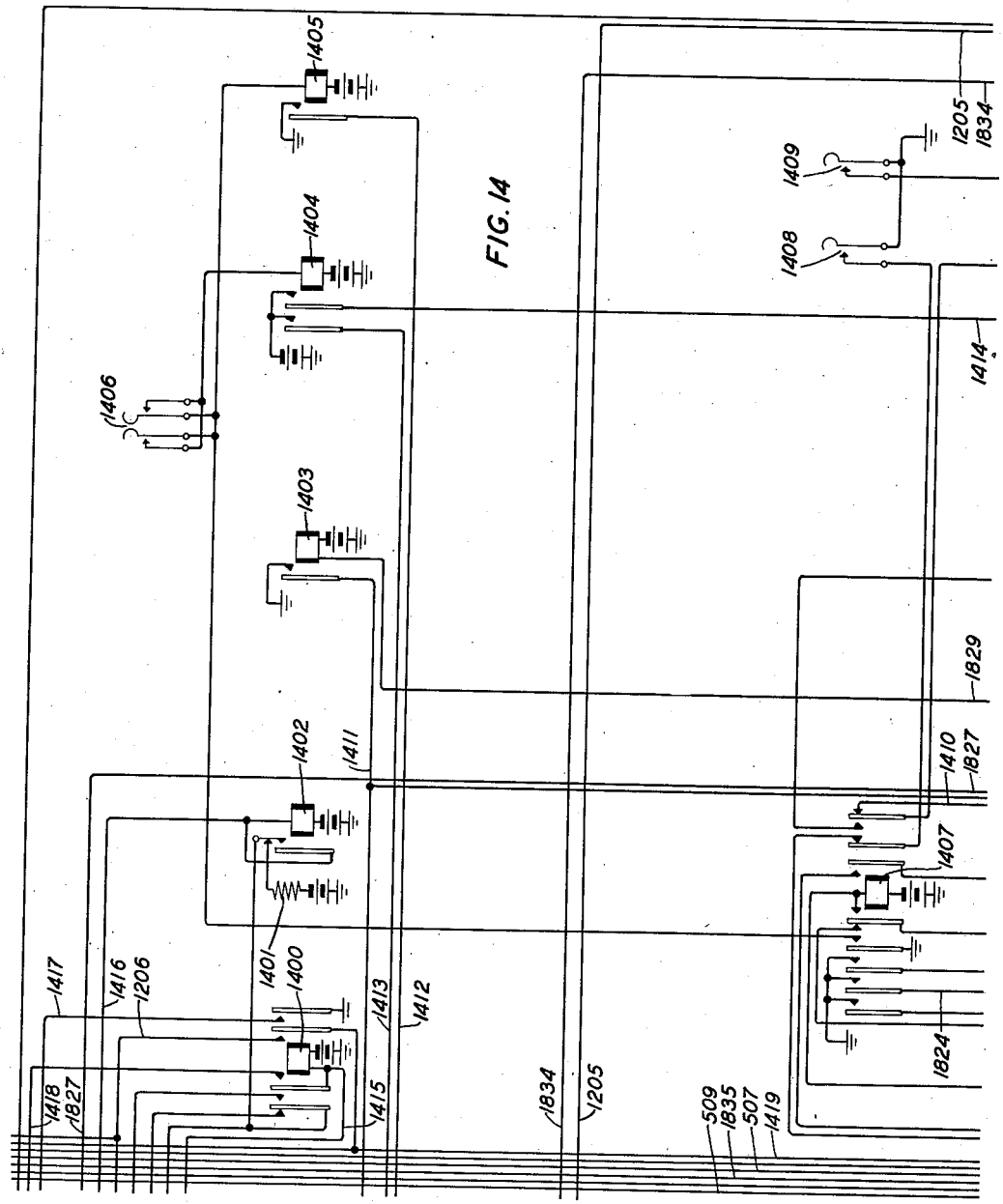

To this end a plurality of keys are provided as follows:

The key-set 1000 includes three sets of code keys, A digit keys 1012 to 1019, B digit keys 1030 to 1039, C digit keys 1050 to 1059. In the same row with the A digit keys are key 1010 for setting the code for a call to a zero operator and key 1011 for setting the code representing a permanent signal. Keys 1070 to 1078 are class of service keys. Keys 1070 to 1077 are operated individually to set up a total of eight classes of service. Keys 1071 to 1077 operated in combination with key 1065 simulate seven classes of calls from a second group of senders. Key 1078 is operated to simulate a call from a key-pulsing A switchboard sender, while key 1079 is operated to simulate a call from a key-pulsing A switchboard sender requiring no marker function. Keys 1090 to 1099 alone or in combination with key 1085 permit the selection of any district frame from 0 to 19. These keys are connected by relays 500 and 501 in parallel with the recording relays of Figs. 4 and 9 and by relays 301 and 801 to the marker so that the record is set up simultaneously in the marker and in the trouble indicator.

In addition to operating the transmitting keys, it is necessary to operate a zone charge checking key when the code calls for a zone charge. There are ten of these keys 1500 to 1509 which correspond to relays in the marker. Therefore, for any test call, the particular key is operated which corresponds to the relay that should operate in the marker for the zone charge required by the code being transmitted. These keys simulate the closures that the marker would ordinarily receive from the zone registration control circuit. If it is desired to test the operation of the marker for a condition where no zone device is available, key 1536 is operated to duplicate this condition.

In addition, keys 504, 505 and 506 are provided to simulate the signal transmitted to the marker when the sender is handling a call from a tip party, when it desires an overflow trunk or an alternate route respectively.

To originate a test call, the code, class of service and district frame transmitting keys are operated to prepare the circuits for transmitting the information for the call to the marker receiving relays. If it is a zone charge call the proper zone charge checking key is operated. The marker to be tested is then selected by operating one of the marker test keys 7917, 1815, 1816, etc.

One of these keys is provided for each marker which has access to the trouble indicator, for selecting the corresponding marker for test. Only one marker test key can be made effective at a time, as the operating circuit for test relay 7918 is carried over the front contact of the associated key and over the back contacts of all of the remaining keys in the series. The operation of the marker test key prepares a circuit for operating its associated marker test relay when the start key 1408 is operated. If the trouble indicator is normal, as indicated by the released condition of relays 1407 and 1810 and all of its recording relays are released, the operation of key 1408 will operate the start relay 1817 over a circuit which may be traced from ground over the start key 1408, inner right back contact of relay 1407, third right back contact of relay 1810 to the right winding of relay 1817 and battery. Relay 1817 closes an operating circuit for relay 7918 which may be traced from battery through the winding of relay 7918, over the operated contact of test key 7917, outer left back contact of relay 1818, second right back contact of relay 1800, back contact of relay 1819 to ground at the right contact of relay 1817. With relay 7918 operated, relay 1817 locks in a circuit from battery over its left winding and left front contact to ground at the second left front contact of relay 7918.

Relay 7918 marks the associated marker busy by connecting ground over its fourth left contact to decoder busy conductor 4333, and starts a test to determine whether the marker is busy. If it is busy the trouble indicator will wait until it becomes idle but will prevent another marker connector circuit from seizing it in the meantime. The test circuit allows a short interval of time after making a marker busy, during which a connector circuit can seize it, to prevent the possibility of a double connection. To do this relay 7918 connects ground over its middle left front contact, right back contact of relay 1823, left normal contact of relay 1822, winding of relay 1821 and battery. Relay 1821 closes a circuit for relay 1822 from battery through the winding of relay 1822, left contact of relay 1821, conductor 1824 to ground at the outer left contact of relay 7918. Relay 1822 operates in this circuit and locks over its left alternate contact and the back contact of relay 1823 to ground at the middle left contact of relay 7918. Relay 1822 at its alternate contact opens the circuit of relay 1821 which releases. Relay 1822 is slow to operate and relay 1821 slow to release to measure off the desired time interval.

Relay 7918 also connects the winding of relay 1825 over the inner right contact of relay 1810, inner right front contact of relay 7918, conductor 4831 of the marker to test whether the marker is busy. If so, ground will be connected to this conductor and relay 1825 will operate to delay the operation of the test circuit until the marker becomes idle. Relay 7918 also connects ground over its inner left contact to the winding of relay 1805 which connects ground to conductor 1806 and to the corresponding conductor individual to each marker having access to the trouble indicator. Since relay 7918 is operated, this ground is ineffective on the selected marker but operates the relay corresponding to relay 5434 in the remaining markers to mark the trouble indicator busy to such markers and to prepare the trouble release circuits.

After relay 1821 is released, if relay 1825 is not operated indicating that the selected marker is idle, a circuit is closed from battery through the winding of relay 1810, back contact of relay 1825, right front contact of relay 1822, back contact of relay 1821 to ground on conductor 1824. Relay 1810 operates in this circuit and locks directly to conductor 1824 over its inner left front contact.

Relay 1810 in operating disconnects relay 1825 from conductor 4331, disconnects conductor 1808 from the contacts of relays 1804 and 1807 to prevent an alarm from being given while the circuit is engaged with testing and connects ground over its outer left front contact, second right front contact of relay 7918 to conductor 1826 thereby operating relays 1602 and 1201 for connecting test controlling leads of the trouble indicator to the marker. Relay 1201 in operating connects ground to conductor 2005, thereby operating relays 302, 2000 and 1601 to prepare the marker for testing. Further, with relay 1201 operated, a circuit is closed from ground at the right back contact of relay 1314, conductor 1827, uppermost contact of relay 1201 to conductor 1203, operating relays 301, 303, 801, 1202 and 1603. The latter relays connect the receiving and transmitting leads of the marker and the trouble indicator. Relay 1201 also closes a circuit from ground over its innermost lower front contact to conductor 1204 and the winding of relay 5318 which further prepares the marker for testing. When relay 1202 operates, it closes a circuit from ground over its next to upper contact, conductor 1205, inner right back contact of relay 1000, left front contact of relay 1810, conductor 1835, winding of relay 502 and battery as a signal to the trouble indicator that the necessary connections have been made. Relay 502 in turn operates relays 500 and 501 which connect the key-set to the registering leads of the marker. Relay 502 also operates relay 1823 in a circuit over its third left contact and conductor 507 to the winding of relay 1823. Relay 1823 extends its operating ground over its inner right contact to the inner right contact of relay 7918 and conductor 4831 to start the marker timing circuit. In addition, relay 502 connects ground over its inner right contact to conductor 508, contact of relay 301 to conductor 4622 to supply ground normally supplied by the marker connector.

In connection with the preparation of the marker for a test call, relay 1400 is connected over conductor 1415 and the armature of relay 1201 to conductor 4618 leading to the marker to simulate the relay in the district junctor which connects that circuit with the district link and connector circuit. Relay 1402 is connected over conductor 1416 and a contact of relay 1201 to conductor 6062 leading to the marker to simulate the hold magnet of the district primary switch. This is necessary to enable the marker to proceed with its functions, since no district junctor or district link and connector circuit is attached to the marker for a test call and the failure of the circuits above-mentioned to close would block the operation of the marker. The marker itself actually selects an idle outgoing trunk, an office link and an office junctor, operating the hold magnets of the district secondary switch, office primary and secondary switches and the select magnets of the office primary and secondary switches, closing the switch cross-points and connecting the sleeve lead from the selected outgoing trunk through the office primary and secondary switches to the hold magnet of the district secondary switch.

The decoder marker upon receiving the code, class of service and district frame information on its receiving relays, makes a test to determine that all of the necessary information for the call has been completed and then proceeds to summon the district and office link and connector circuits and to select an idle outgoing trunk in the manner described in the above-identified Carpenter application. When handling service calls, the marker also connects to the district junctor circuit from which the call originated and selects an idle combination or district link, office junctor and office link paths between the district junctor circuit and the selected outgoing trunk. However, since the district junctor circuit is not used for a test call, certain circuits normally operated from the district junctor are simulated as above described.

When the marker connects to the district link and connector circuit, that circuit returns ground to the marker to indicate that the connection has been completed. This ground is normally extended over conductor 4618 through the sender to the district junctor to complete connection between the district junctor and the marker. This ground connected to conductor 4618 now extends over contact of relay 1201, conductor 1415 to the winding of relay 1400 which operates and connects ground over conductor 1417 to the winding of relay 1535 and battery. It also extends the ground applied over conductors 4618 and 1415 over its inner left front contact, to conductor 1418, contact of relay 302 and conductor 5849 which extends in the marker to the winding of relay 6001, to simulate to the marker the signal transmitted as an indication that the connection with the district junctor has been completed, and that the decoding stage has been terminated.

Figure 15:
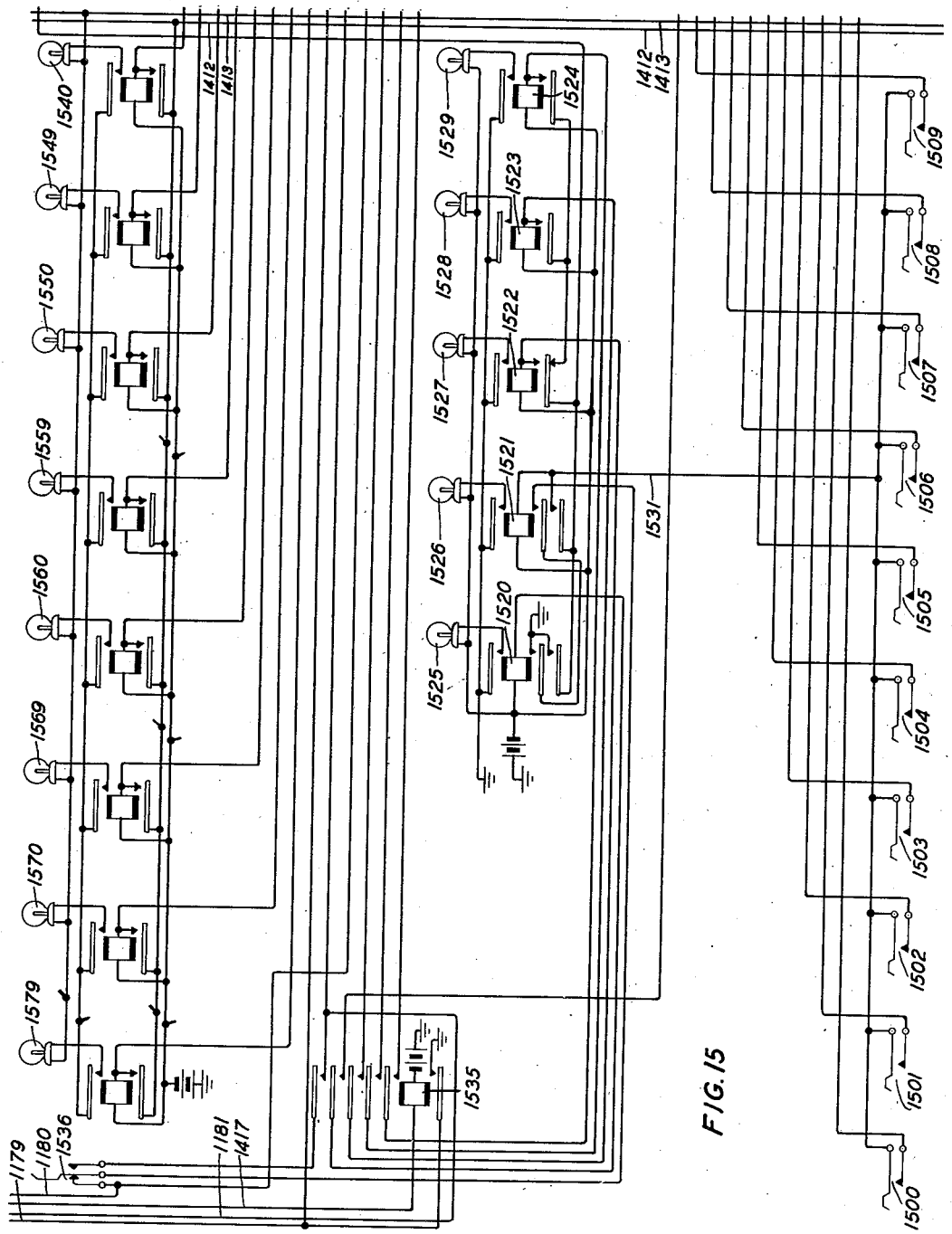
Figure 16:
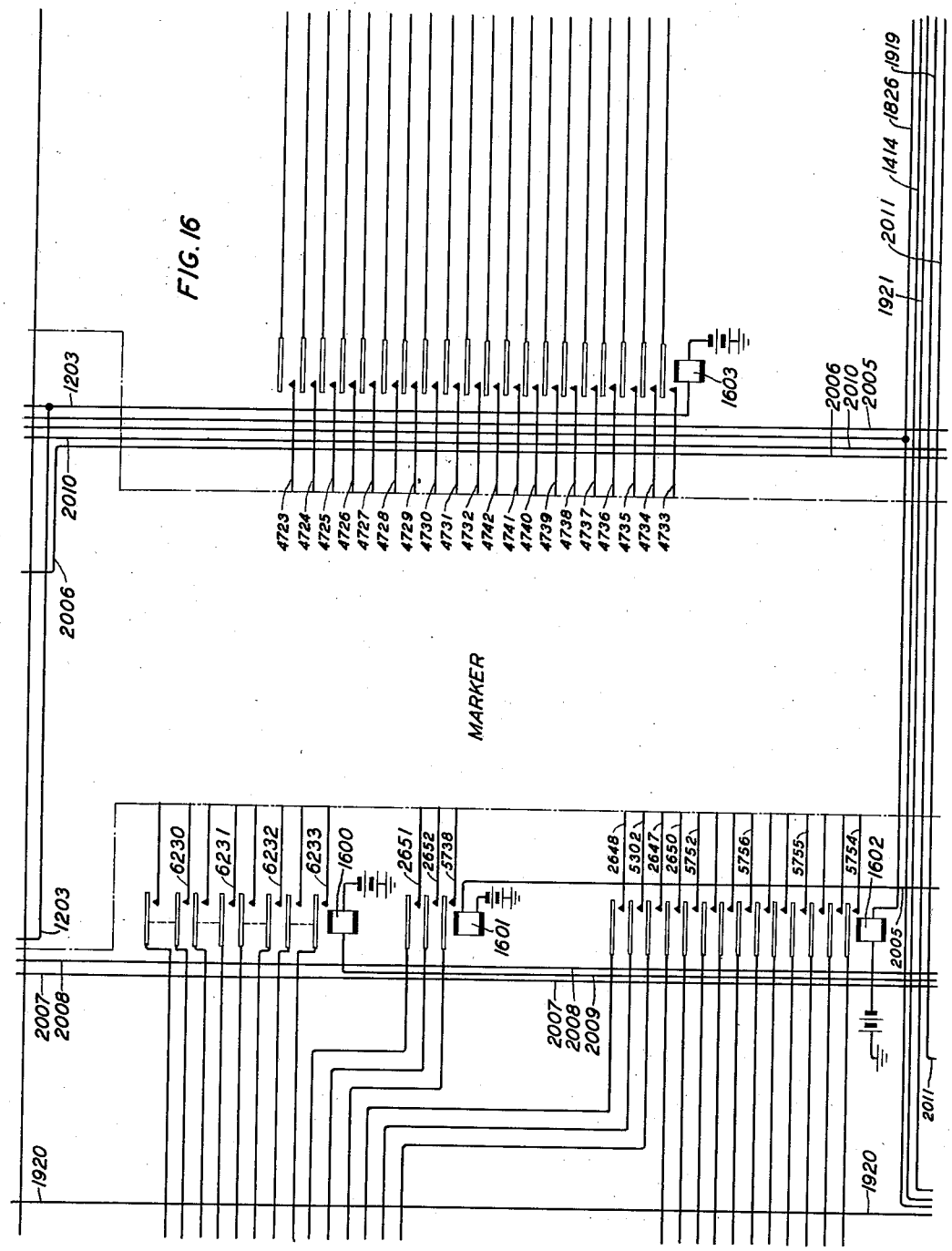
Figure 17:
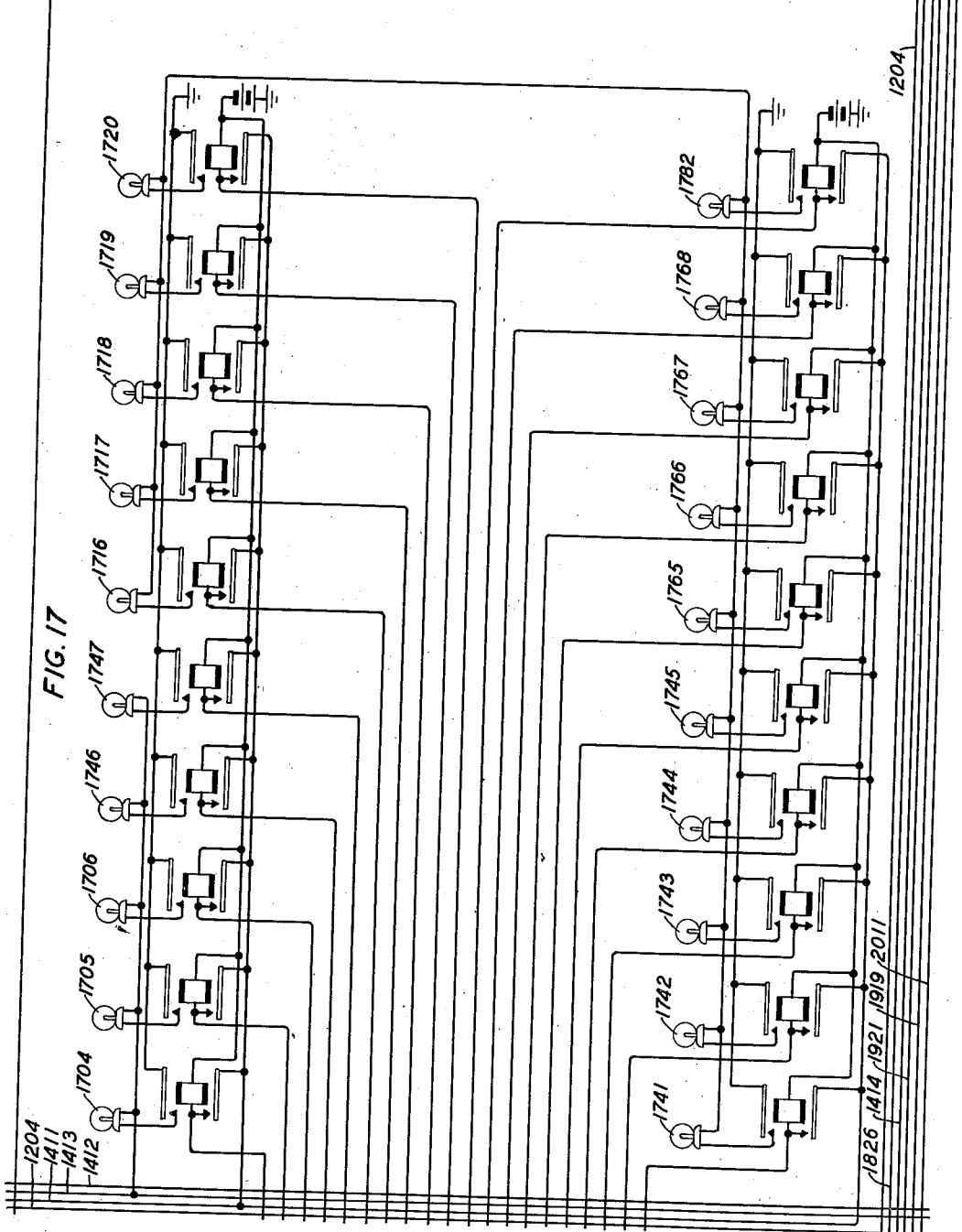

Relay 1535 enables the marker to perform its charge and talking transmission functions with the relays in Fig. 15 corresponding to similar relays in the district junctor circuit and the zone registration control circuit when the code is for a call requiring zone charging.

*Sender release*

If the decoder marker successfully translates the information set up on its receiving relays and advances to the stage where its sender release relay is operated, it grounds conductor 4708. In the case of a regular service call, this will cause the sender to be disconnected by the marker connector circuit but with the test call it operates relay 1916 in the trouble indicator circuit over a contact of relay 2000, conductor 1918 and the upper winding of that relay. Relay 1916 prepares a path for lighting lamp 1917 and operates relay 1801 in a circuit from battery through the left winding of relay 1801, conductor 509, fourth left contact of relay 502, conductor 1920 to ground at the outer upper front contact of relay 1916. Relay 1801 locks in a circuit from battery through its left winding and inner left contact to ground at the outer right back contact of relay 1800 and connects ground over its second left front contact to conductor 1919 to supply a locking circuit for relay 1916. Relay 1801 closes a circuit from battery through the winding of relay 1403, conductor 1829, fifth left contact of relay 1801 to ground at the left back contact of relay 1828. Relay 1403 supplies locking ground over conductor 1411 to the relays of Figs. 4, 9, 13 and 17 and to the relays controlling lamps 231 and 232 thereby locking the record of the code set up in the marker and the selection control information set up in response thereto by the marker. Relay 1801 opens the circuit of relays 6716, 6836 and 6517. The connection of ground to conductor 1411 by relay 1403 completes a circuit over the outer right front contact of relay 1810 to the winding of relay 1814 and battery. Relay 1814 locks directly to conductor 1411. The operation of relay 1814 opens the circuit of relays 1603, 1202, 801, 301 and 303 disconnecting the recording and transmitting relays of the marker from the trouble indicator. The release of relay 1202 also releases relays 500, 501 and 502 which in turn disconnect ground from conductors 4622 and 4831 leading to the marker and disconnect the test call transmitting keys, thus simulating the disconnection of the sender from the marker. Relay 1823 in the trouble indicator will remain operated after relay 502 releases by ground connected to conductor 4831 by the marker. Relay 1823 will therefore remain locked until the marker is released and returned to normal. This relay is for the purpose of preventing the trouble indicator from dismissing the marker until after its return to normal. The recording relays hold the record of the information transmitted to and received from the marker.

The operation of relay 1400 connects conductors 5864, 2649 together and to battery through resistance 1401 to simulate the district link primary switch hold magnet for the test of the channel elements. When the office secondary hold magnet has been operated, ground is connected to conductor 6062 thereby operating relay 1402 over conductor 1416. Relay 1402 disconnects resistance 1401 from conductors 5864 and 2649, connects its own winding thereto and extends its operating ground thereover. As a result relays 6001 and 1400 are released.

*Marker release*

When relay 1400 releases, the operating ground for relay 1402 is extended to the marker to complete a marker release circuit which, because relay 5318 is operated, results in the operation of relay 2200 in the trouble indicator. Relay 2200 closes ground over its lower contact, lower front contact of relay 5318, to the winding of relay 5413.

The operation of relay 5413 in the marker by either the call being completed or by the expiration of the time interval connects battery to conductor 5430 operating relay 7900 associated with the marker under test.

The operation of relay 7900 closes the previously traced circuit for operating relay 2902 which in turn operates multi-contact relays 300, 302, 803, 1661, 2001, 2003, 1600, 2000, 2004, 1200. However, relays 6716, 6836 and 6517 are not operated since the ground was removed from their circuit by relay 1801 as above described. Therefore the multi-contact relays 303, 301, 801, 1202 and 1602 are not operated to close the transmitting and receiving leads, the record previously taken from these leads being held by the trouble indicator. The operation of relay 2001 connects ground over its inner contact to conductor 2011 thereby operating relay 1807 which locks to ground at the left back contact of relay 1800 and prepares a circuit for lamp 1831. Relay 1807 also closes a circuit from ground at its middle left contact, inner left back contact of relay 1407 to the winding of relay 1811 and battery. Relay 1811 closes a circuit from ground over its contact through resistance 1812 to the winding of relay 1813 which operates slowly.

Relay 1804 is operated by relay 5413 and locks to ground at the middle left contact of relay 1800. In the case of a test call, lamp 7910 is lighted in a circuit from ground over the right contact of key 7917, outer left contact of relay 1804 to lamp 7919 and battery under the control of lamp key 1406 and relay 1404. The relay corresponding to relay 1804 of any other markers that attempt to summon the trouble indicator while it is busy may operate and light lamps to indicate the markers that failed without a record being taken.

The operation of relay 1813 causes the operation of relay 1407 as previously described, relay 1407 locking under the control of relay 1807. Relay 1407 closes a circuit for relay 1405 to lock the recording relays not already locked by relay 1403 and releases relay 1811. The release of relay 1811 opens the circuit of relay 1813 which releases relay 2002 and the multi-contact relays operated thereby. The release of relay 1813 completes a circuit from ground over the back contact of relay 1813, inner right front contact of relay 1407, inner right front contact of relay 1810, outer right front contact of relay 7918, conductor 5439 and the upper winding of relay 5434 and battery to signal the marker to return to normal. This circuit is effective only on the marker being tested due to the operation of relay 7918 which opens the circuit provided by relay 1805.

When the marker is released it removes ground from conductor 4831, releasing relay 1823 in the trouble indicator. The release of this relay with relay 1821, operates relay 1819. Relay 1819 lights lamp 1832 and releases relay 7918. The release of relay 7918 removes ground from the marker busy conductor 4833, and from conductor 1826 and releases relay 1817. The disconnection of ground from conductors 1826 and 4833 releases the test preparation relays in the marker and removes the busy condition.

After the trouble indicator is disconnected from the marker, relays 1807, 1804, 1801 and 1916 are locked operated to ground over the back contacts of relay 1809 and therefore cannot be released until the release key 1409 is operated, operating relay 1800. Relay 1807 holds relay 1407 operated and the latter relay holds relays 1810, 1403 and 1405 and provides ground for operating relay 1404 when lamp key 1406 is operated. Relay 1810 is also locked under the control of relay 1801. Relays 1403 and 1405 hold the recording relays and relay 1814. Relays 1814 and 1810 hold relay 1805 operated to make the trouble indicator busy while it is holding the record. The information recorded can now be displayed by operating the lamp key 1406.

The operation of key 1406 operates relay 1404 which connects battery over conductors 1413 and 1414 to all of the display lamps and those which are grounded by their associated recording relay being operated will light, thus displaying the information taken from the marker. The lamps will remain lighted until the lamp key, which is of the locking type, is released.

To release the trouble indicator, key 1409 is operated, operating relay 1800. This relay locks through its secondary winding to the operated relay 1818 and opens the locking circuits of relays 1807, 1804, 1916 and 1801 which release. The release of relay 1807 in turn releases relay 1407 which releases relays 1403 and 1405 as well as relay 1404 if operated. Relays 1403 and 1405 release the recording relays except those that lock under control of relays 1800 and 1801. Relays 1916 and 1407 release relay 1810 and which in turn releases relay 1805 and relay 1800 restoring the circuit to normal. Relay 1822 which was operated at the start of the test is released when relay 1823 operates so that it will have time to completely deenergize before another call is started.

After the release key has been operated, another test call can be started on the same marker by operating the start key 1408. The code, class of service and district frame transmitting keys will remain operated unless reset for a different call.

If the marker, while being tested, encounters trouble before completing its regular functions, it will call for the trouble indicator when its timing relays operate relay 5413.

The marker normally selects an idle outgoing trunk before giving a sender release signal. If it is unable to find an idle trunk while handling a test call, relay 1904 will operate over conductor 7143, contact of relay 2000 and conductor 1906. The operation of relay 1904 connects ground to conductor 1920 operating relay 1801. It also connects ground over its outer lower contact to conductor 1921, operating relay 1828. Thereafter a complete record is taken of the information set up on the marker, after which the connecting relays are released and the marker returns to normal.

When the marker encounters a message register check failure, or an all-channels-busy condition or selects a trunk which is subsequently taken by a panel selector, it will ordinarily operate its release relay and connect ground to conductor 2644 if it is a first or second trial call and then restore to normal. If it is a third trial call it will simply restore to normal. However, on a test call the operation of relay 5318 in the marker transfers the operating circuit for the release relay to relay 2200 in the trouble indicator circuit. The operation of this relay summons the trouble indicator to take a complete record as already described for a completed call. In addition, relays 1901, 1907 or 1910 will be operated and prepare a path for lighting their associated lamps 1902, 1908 or 1911, respectively, to indicate what caused the circuit to fail in completing the call. In addition, lamp 1833 will be lighted indicating that a marker gave a trouble release signal provided that it is a first or second trial call. Lamp 1902 indicates that the marker failed to receive a check of the message register lead. Lamp 1908 indicates that the marker encountered an all-channels-busy condition, while lamp 1911 indicates that the trunk selected by the marker was taken by a panel selector.

The test control circuit in the trouble indicator is arranged to immediately release the trouble indicator and the marker circuits at any time. If for any reason, it is desired to wipe out a call after operating the start key 1408, the operation of release key 1409 will operate relay 1800 and restore the trouble indicator to normal. If the marker has been seized it will also be restored by this action. The operation of relay 1800 in addition to opening the locking circuit for all relays in the trouble indicator, opens the circuit of relay 502 thereby causing that relay to release and in turn release relays 500 and 501. Relay 1800 also connects ground from the outer left front contact of relay 1823 over the inner right contact of relay 1800 to conductor 1834 over the contact of relay 302 to conductor 5316 leading to the marker. If the marker is in its decoding stage the release of relay 502 will restore it to normal but if it is in the marker stage, ground on conductor 1834 will cause it to restore. In either case ground will be removed from conductor 4831 and relay 1823 in the trouble indicator will release permitting the trouble indicator circuit to disconnect. A second call can be immediately started by operating the start key 1408. If key 1408 is operated prematurely it will be ineffective until the trouble indicator has restored to normal.

What is claimed is:

1. In a telephone system, control, equipment, a trouble indicator, means in said control equipment responsive to failure to operate successfully to connect said control equipment with said trouble indicator and establish a record therein of the operation of said control equipment, and means in said trouble indicator for testing said control equipment comprising means for transmitting a simulated call record to said control equipment and means for modifying the control of said connecting means to render it also responsive to the successful completion of the operation of said control equipment.

2. In a telephone system having subscribers' lines and switches for establishing connections between said lines, a control equipment, means in said control equipment responsive to a recorded designation therein for controlling the operation of said switches, means for testing the continuity of the connection between said switches and said lines, means responsive to the successful completion of said continuity test for releasing said control equipment, testing equipment for testing said control equipment by setting up a simulated designation therein, and means controlled by said testing equipment for simulating a successful continuity test to permit the release of said control equipment.

3. In a telephone system, control equipment having means for successively performing a decoding function and a switch controlling function in connection with one call, means to permit said control equipment to perform the decoding function on a second call prior to the completion of the switch controlling function on said one call, a trouble indicator, means to connect said control equipment with said trouble indicator in response to failure to function promptly, means in said trouble indicator for recording the operation of said control equipment, and means to indicate whether said control equipment is handling one call or two calls.

4. In a telephone system, control equipment having means for successively performing a decoding function and a switch controlling function in connection with one call, means to permit said control equipment to perform the decoding function on a second call prior to the completion of the switch controlling function on said one call, a trouble indicator, means to connect said control equipment with said trouble indicator in response to failure to function promptly, means in said trouble indicator for recording the operation of said control equipment, means to indicate whether said control equipment is handling one call or two calls, test means in said trouble indicator for testing said control equipment by simulating a call and means for separately recording the results of said decoding function and said switch controlling function in response to said simulated call.

5. In a telephone system having subscribers' lines, means for establishing connections between said lines, a sender, means for recording a wanted line designation in the sender, a decoder marker, means for connecting said sender with one of said decoder markers, means in said decoder marker for receiving and decoding said wanted line designation, means to transmit a part of the decoded designation to the sender, means to disconnect said decoder marker from said sender and means responsive to said disconnection to control certain of said switches in accordance with another part of said decoded designation, a trouble indicator, means normally responsive to failure of said decoder marker to operate promptly to connect said decoder marker with said trouble indicator and to record the operation of said decoder marker in said trouble indicator, means in said trouble indicator to test said decoder marker by transmitting a simulated line designation to said decoder marker, means for recording the part of the decoded designation normally transmitted to the sender, means for transmitting a disconnect signal to cause said decoder marker to advance to its swtich controlling function and means for subsequently recording the result of said switch controlling function.

ALBERT C. POWELL.